(12) United States Patent
Rouat et al.

(10) Patent No.: US 9,317,540 B2
(45) Date of Patent: Apr. 19, 2016

(54) METHOD, SYSTEM AND AGGREGATION ENGINE FOR PROVIDING STRUCTURAL REPRESENTATIONS OF PHYSICAL ENTITIES

(75) Inventors: Jean Rouat, Quebec (CA); Jocelyn Bergeron, Ottawa (CA); Louis-Charles Caron, St-Ferreol-les-Neiges (CA); Vincent de Ladurantaye, Notre Dame du Portage (CA); Frederic Mailhot, Sherbrooke (CA)

(73) Assignee: SOCPRA SCIENCES ET GENIE S.E.C., Sherbrooke, Quebec (CA)

( * ) Notice: Subject to any disclaimer, the term of this patent is extended or adjusted under 35 U.S.C. 154(b) by 315 days.

(21) Appl. No.: 14/123,895

(22) PCT Filed: Jun. 5, 2012

(86) PCT No.: PCT/CA2012/000550
§ 371 (c)(1),
(2), (4) Date: Jan. 9, 2014

(87) PCT Pub. No.: WO2012/167359
PCT Pub. Date: Dec. 13, 2012

(65) Prior Publication Data
US 2014/0114975 A1    Apr. 24, 2014

Related U.S. Application Data

(60) Provisional application No. 61/493,672, filed on Jun. 6, 2011.

(51) Int. Cl.
*G06F 17/30* (2006.01)
*G06F 7/24* (2006.01)
(Continued)

(52) U.S. Cl.
CPC ............ *G06F 17/30289* (2013.01); *G06F 7/24* (2013.01); *G06F 17/30598* (2013.01); *G06K 9/00973* (2013.01); *G06K 9/468* (2013.01);
(Continued)

(58) Field of Classification Search
None
See application file for complete search history.

(56) References Cited

U.S. PATENT DOCUMENTS 5,274,714 A    12/1993   Hutcheson et al.
6,847,731 B1    1/2005   Caulfield

FOREIGN PATENT DOCUMENTS

GB          2238151        5/1991
WO      2006000103 A1      1/2006
(Continued)

OTHER PUBLICATIONS

Riesenhuber et al., "Hierarchical models of object recognition in cortex," Nature neuroscience, vol. 2, No. 11, pp. 1019-1025, 1999.
(Continued)

*Primary Examiner* — Alex Gofman
(74) *Attorney, Agent, or Firm* — BCF LLP

(57) ABSTRACT

The present disclosure relates to a method a system and an aggregation engine for providing a structural representation of a physical entity. Processing units provide representation of elements composing the physical entity. Processing units comprise a label, which represent the elements, and a state. Links are established between the processing units. By iteration in the aggregation engine, the states and labels of the processing units are updated based on states and labels of linked processing units. A graphical representation of the physical entity is obtained based on the labels, on the states, and on the links.

27 Claims, 34 Drawing Sheets

(51) Int. Cl.
G06K 9/00 (2006.01)
G06K 9/46 (2006.01)
G06F 15/16 (2006.01)

(52) U.S. Cl.
CPC .......... *G06K 9/469* (2013.01); *G06F 2207/222* (2013.01)

(56) References Cited

FOREIGN PATENT DOCUMENTS

WO 2007071070 A1 6/2007
WO 2009113993 A1 9/2009

OTHER PUBLICATIONS

Lecun et al., "Gradient-based learning applied to document recognition," Proc. of the IEEE, vol. 86, No. 11, Nov. 1998, pp. 2278-2324.
Brown, "Calendar queues: A fast 0(1) priority queue implementation for the simulation event set problem," Communications of the ACM, vol. 31, No. 10, pp. 1220-1227, Oct. 1988.
Rönngren et al., "Lazy queue: A new approach to implementing the pending-event set," in Proceedings of the 24th Annual Simulation Symposium, New Orleans, Louisiana, Apr. 1-5, pp. 194-204,1991 IEEE.
Tang et al., "Ladder queue: An O(1) priority queue structure for large-scale discrete event simulation," ACM Transactions on Modeling and Computer Simulation (TOMACS), vol. 15, No. 3, pp. 175-204, Jul. 2005.
Van Emde Boas et al., "Design and implementation of an efficient priority queue," Mathematical Systems Theory, vol. 10, No. 1, pp. 99-127, 1977.
Rönngren et al., "A comparative study of parallel and sequential priority queue algorithms," ACM Transactions on Modeling and Computer Simulation, vol. 7, No. 2, pp. 157-209, Apr. 1997.
Bhagwan et al., "Fast and scalable priority queue architecture for high-speed network switches," in Infocom 2000. Nineteenth Annual Joint Conference of the IEEE Computer and Communications Societies, Proceedings, IEEE, vol. 2. IEEE, 2000, pp. 538-547.
Blair, "Low cost sorting circuit for VLSI," Circuits and Systems I: Fundamental Theory and Applications, IEEE Transactions on, vol. 43, No. 6, pp. 515-516, 1996.
Ioannou et al., "Pipelined Heap (Priority Queue) Management for Advanced Scheduling in High-Speed Networks," IEEE/ACM Transactions on Networking, vol. 15, No. 2, pp. 450-461, Apr. 2007.
Moon et al., "Scalable hardware priority queue architectures for high-speed packet switches," Computers, IEEE Transactions on Computers, vol. 49, No. 11, pp. 1215-1227, Nov. 2000.
Thompson, "The VLSI complexity of sorting," Computers, IEEE Transactions on Computers, vol. C-32, No. 12, pp. 1171-1184, Dec. 1983.
Wang et al., "Pipelined van Emde Boas Tree: Algorithms, Analysis, and Applications," IEEE Infocom 2007—26th IEEE International Conference on Computer Communications, pp. 2471-2475, May 2007.
Zhang et al., "A simple and efficient VLSI sorting architecture," in Circuits and Systems, 1994., Proceedings of the 37th Midwest Symposium on, vol. 1. IEEE, 1994, pp. 70-73.

Peskin, Mathematical aspects of heart physiology—Principles of Electrophysiology With Special Reference to the Heart. Courant Institute of Mathematical Sciences, New York University, pp. 241-278, 1975.
Mirollo et al., "Synchronization of Pulse-Coupled Biological Oscillators," SIAM Journal on Applied Mathematics, vol. 50, No. 6, pp. 1645-1662, 1990.
Caron et al., "Digital Hardware Neural Network Simulator for Signal Processing based on Spike Synchronization", 14th. Inter. Conf. On Cognitive and Neural Systems, Boston, USA, May 19-22, 2010.
De Ladurantaye et al., "Visual Objects Recognition by Temporal Association Coding of Hierarchical Features", 14th. Inter. Conf. On Cognitive and Neural Systems, Boston, USA, May 19-22, 2010.
Rouat et al., "Towards Neurocomputational Models of Speech and Sound Processing", Lecture Notes in Computer Science, Springer-Verlag, vol. 4391, 2007.
Pichevar et al., "Monophonic Source Separation with an Unsupervised Network of Spiking Neurones", Neurocomputing 71, pp. 109-120 (Elsevier), Dec. 2007.
Pichevar et al., "The Oscillatory Dynamic Link Matcher for Spiking-Neuron-Based Pattern Recognition", Neurocomputing (Elsevier), vol. 69, pp. 1837-1849, Oct. 2006.
Rouat et al., "Perceptive, Non-linear Speech Processing and Spiking Neural Networks", Nonlinear Speech Modeling, LNAI 3445, pp. 317-337, 2005.
Pichevar et al., "A Quantitative Evaluation of a Bio-Inspired Sound Segregation Technique for Two- and Three-Source Mixtures", Lecture Notes in Computer Science, vol. 3445, Springer-Verlag, 2004.
Rouat et al., "Source separation with one ear: Proposition for an anthropomorphic approach", EURASIP Journal on Applied Signal Processing, No. 9, pp. 1365-1373, 2005.
Tanaka, "Mechanisms of visual object recognition : monkey and human studies", Current Opinion in Neurobiology, vol. 7, No. 4, p. 523-529, 1997.
Grauman et al., "The Pyramid Match Kernel: Discriminative Classification with Sets of Image Features". Proceedings of the IEEE International Conference on Computer Vision(ICCV), Beijing, China, 2005.
Kavukcuoglu et al., "Fast Inference in Sparse Coding Algorithms with Applications to Object Recognition ", Technical report, Computational and Biological Learning Lab, Courant Institute, NYU, 2008.
Masquelier et al., "Unsupervised learning of visual features through spike timing dependent plasticity", PLoS Computational Biology, vol. 3, No. 2, 2007.
Molotchnikoff et al., "Brain at work: Time, sparseness and multiplexing/superposition principles", Frontiers in BioScience, Submitted Apr. 2009.
Malsburg, "The Correlation heory of Brain Function", Internal Report 81-2, Max-Planck Institute for Biophysical Chemistry, Dept. of Neurobiology, Jul. 1981.
Milner, "A Model for isual Shape Recognition", Psychological Review, vol. 81, No. 6, pp. 521-535, 1974.
Ioannou et al., "Pipelined Heap (Priority Queue) Management for Advanced Scheduling in High-Speed Networks", IEEE/ACM Transactions on Networking, vol. 15, No. 2, Apr. 2007.
Bergeron, "Reconnaissance accélérée de formes par un réseau optimisé avec neurones à champs récepteurs synchrones", Mémoire de maîtrise ès sciences appliquées, Dec. 2008.

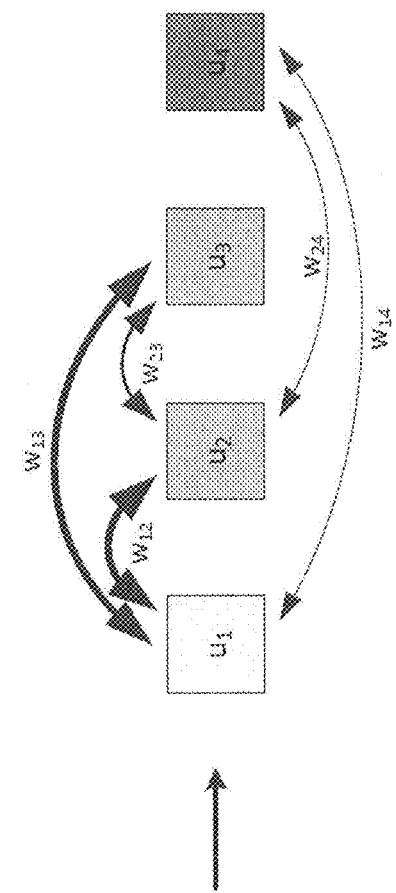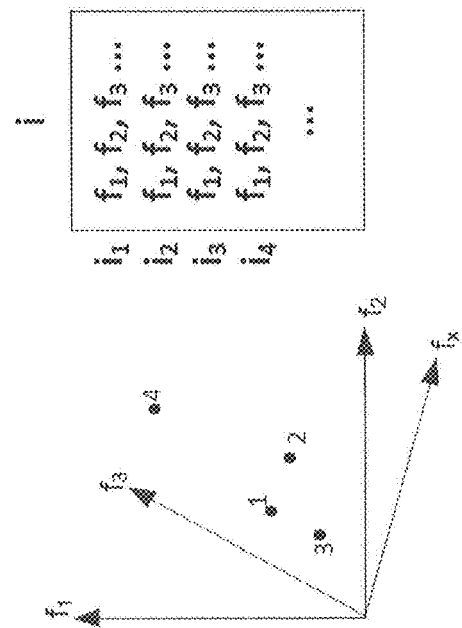
Figure 18

METHOD, SYSTEM AND AGGREGATION ENGINE FOR PROVIDING STRUCTURAL REPRESENTATIONS OF PHYSICAL ENTITIES

TECHNICAL FIELD

The present disclosure relates to the field of intelligent systems. More specifically, the present disclosure relates to a method, an aggregation engine and a system for providing structural representations of physical entities.

BACKGROUND

Pattern recognition is an aspect of the field of artificial intelligence aiming at providing perceptions to "intelligent" systems, such as robots, programmable controllers, speech recognition systems, artificial vision systems, sensorial substitution systems, and the like.

In pattern recognition, objects are classified according to some chosen criteria so as to allow these objects to be compared with each other, for example by comparing a target object with a well-known, basic object. Comparison is made by computing a distance between the base and target objects as a function of the chosen criteria. Accordingly, it is possible, for example, to quantify the similarity or dissimilarity between two objects, to remember an object and to recognize this object later on.

An object, as referred to hereinabove, is not restricted to a physical shape or a visual representation; it has to be understood that an object means any entity that may be represented by a signal.

In general, but not restrictively, the term "distance" may be construed as a mathematical function for measuring a degree of dissimilarity between two objects. For example, if the two objects are assimilated to two respective vectors, this distance may be the Euclidian norm of the difference between the two vectors. The distance could also be, for example, a probability, an error, a score, etc.

Those of ordinary skill in the art of rule-based expert systems, statistical Markovian systems or second generation neural network systems are familiar with such a concept of "distance".

Unfortunately, pattern recognition is often an important computational burden. Furthermore, object comparison—or more generally comparison between physical entities of any type—is usually obtained by first comparing segments of the objects, which involves computationally intensive distance comparison. Additionally, object comparison is based on the premise that there is a well-defined basic object for use as a comparison base for characterizing a target object. Such basic object is not always available and techniques relying on the availability of basic objects are not well-suited for characterizing new or different objects.

Therefore, there is a need for an efficient technique for recognizing internal structures of physical entities, or objects, while reducing the amount of computation time required to provide a usable structure representation.

SUMMARY

According to the present disclosure, there is provided a method for providing a structural representation of a physical entity. A state and a label of a first processing unit are updated, through at least one iteration of an aggregation engine, based on a state and on a label of a second processing unit, and on a link defined between the first processing unit and the second processing unit. A graphical representation of the physical entity based on the link and on the labels of the first and second processing units is then formed.

According to the present disclosure, there is also provided a system for providing a structural representation of a physical entity. The system comprises a first processing unit having a label representing an element of a physical entity. The first processing unit has a state and a link element for setting up at least one link towards a second processing unit. The system also comprises an aggregation engine for updating, through at least one iteration, the state and the label of the first processing unit based on a state and on a label of the second processing unit, and on the at least one link. An output of the system provides a graphical representation of the physical entity based on the at least one link and on the labels of the first and second processing units.

The present disclosure further provides an aggregation engine for providing a structural representation of a physical entity. The aggregation engine comprises an interface for communicating with processing units, a processor, and a graphical unit. The processor is configured to update, through at least one iteration, a state and a label of a first processing unit based on a state and on a label of a second processing unit, and on a link defined between the first processing unit and the second processing unit. The graphical unit forms a graphical representation of the physical entity based on the link and on the labels of the first and second processing units.

The foregoing and other features will become more apparent upon reading of the following non-restrictive description of illustrative embodiments thereof, given by way of example only with reference to the accompanying drawings.

BRIEF DESCRIPTION OF THE DRAWINGS

Embodiments of the disclosure will be described by way of example only with reference to the accompanying drawings, in which:

FIG. 18 shows an application of the system to clustering with a set of inputs i characterized by features f;

DETAILED DESCRIPTION

Figure 1:
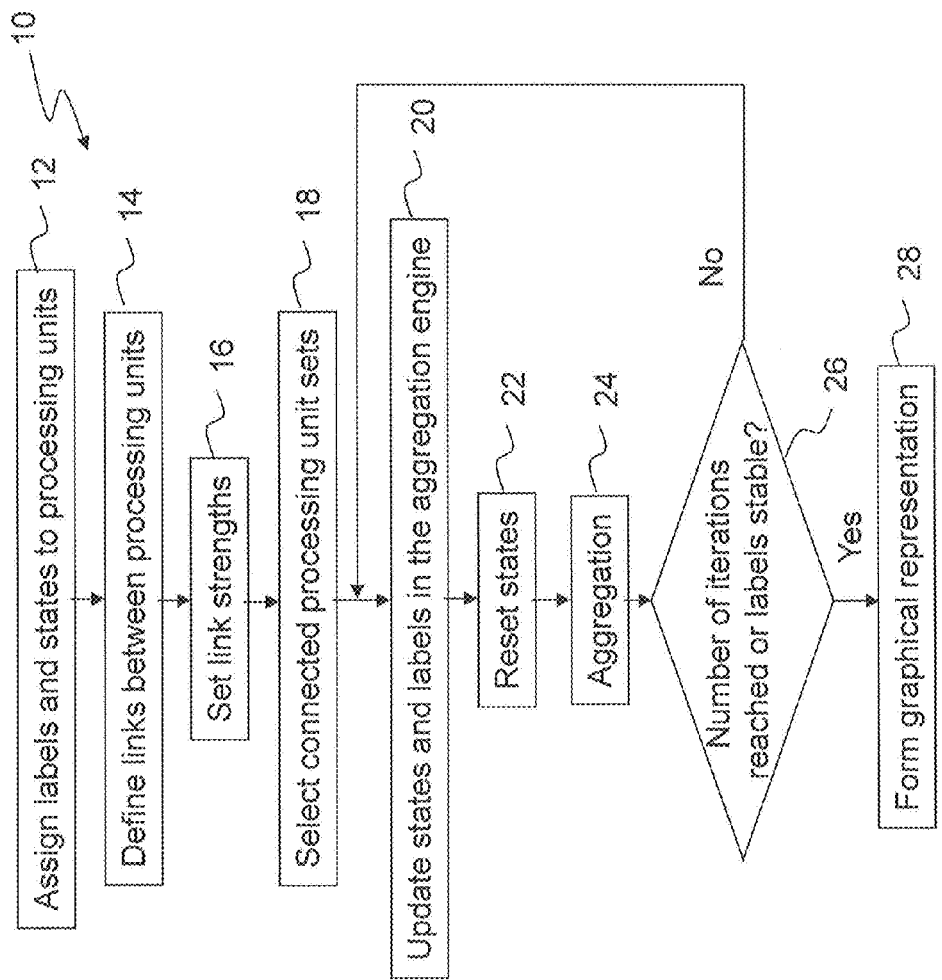
FIG. 1 is an example of a sequence of steps of a method for providing a structural representation of a physical entity.

Various aspects of the present disclosure generally address one or more of the problems of revealing the internal structures of physical entities and using these structures to recognize patterns, while reducing the amount of computation time required to provide a usable structure representation. This may be done based on an aggregation operation implemented within an aggregation engine. Revealed patterns may be used to represent parts, or constituents, of the physical entities.

The following terminology is used throughout the present disclosure:

Physical Entity

A physical entity is a real life object. This term is not limited to concrete objects, but also encompasses any entity that may be graphically represented. Non-limiting examples of physical entities comprise any tangible object, for example manufactured goods. Other non-limiting examples of physical entities comprise abstract objects such as a telecommunications network, or the Internet. Further non-limiting examples of physical entities comprise intangible objects such as an image, a text, a musical piece, and the like.

Element

A separable constituent of a physical entity. For example, an element may comprise a pixel of an image, a word in a text, or a note in a musical piece.

Structure

A structure is a high level, real life complex organization composed of a plurality of elements of a physical entity. A structure may be for example the disposition of pixels in an image. In another example, a structure may comprise a group of notes forming a chord or a sequence of notes in a musical piece.

Graph

A graph is an observable representation of a structure. By extension, a graph provides a graphical representation.

Pattern

Within a graph that represents a structure, a pattern is formed of a plurality of elements sharing one or more same or similar characteristics.

Processing Unit

A processing unit (PU) is an entity capable of performing a mathematical computation. A PU may comprise a neuron within a neural network. A PU may also comprise a physical node in a telecommunications network, for example a router, a server, a client computer, a radio base station, a mobile terminal, a telecommunications switch, and the like. As such, a PU may comprise a processor, memory, internal busses and input/output equipment for exchanging information with peer PUs and with other nodes. In the context of the present disclosure, a PU may be tasked with representing an element, or a pattern.

Label

A label is an internal representation, encoded within a PU, of an element of a physical entity. A value assigned to the label corresponds to a characteristic of the element. PUs representing elements that share a same (or similar) characteristic also share a same (or similar) label value and form a pattern inside the structure, suitable for aggregation. If no a priori information is known about a given element, then a corresponding processing unit may be assigned a unique initial label. As structures are identified during processing, various processing units either propagate their labels to other units or will accept labels from other units. As a non-limiting example, where the element is an image pixel, the label may represent its color and the label value may designate red, green or blue. As another non-limiting example, where the physical entity is a web site, the label may represent, as an element of the web site, a type of content of the web site and the label value may designate news, educational, sport, music, and the like. In yet another example, where the physical entity is a music piece, the label may represent a position of a music note, which is an element of the music piece, on a musical scale.

Link

Links between PUs reflect relationships between the elements, or constituents, of a physical entity, according to its structure. A link between two PUs has a strength determined according to a proximity of corresponding elements of the physical entity, as determined by the structure. A given link may tend to be strong when established between PUs representing two elements being proximate to one another. In this context, "proximity" may relate to similarities between features of the two elements, instead of or in addition to a physical proximity. Labels of the PUs and their links may be used to represent the structure on a graph. As expressed hereinabove, PUs may comprise neurons of a neural network, physical nodes in a telecommunications network, routers, servers, client computers, radio base stations, mobile terminals, telecommunications switches, and the like. Consequently, a link between peer PUs may comprise a physical communication path supported by appropriate hardware at each PU.

State

A state of a PU reflects its level of influence on other linked PUs. A PU whose state meets a threshold may copy its label value onto linked PUs if those linked PUs also have a sufficient state level.

Updating

In the context of the present disclosure, updating comprises a modification of a state, or label, or both, within a PU, based on a previous state of the PU, and on a combination formed by a state and a label of another PU, factoring a strength of a link between these PUs.

Aggregation

Aggregation is a process wherein states and labels of the PUs are iteratively updated until PUs representing elements having similar characteristics eventually share the same or similar label values.

Aggregation Engine

An aggregation engine is an entity capable of processing information related to PUs. An aggregation engine may be implemented as a neural network. An aggregation engine may also be part of a physical node in a telecommunications network, a router, a server, and the like. As such, an aggregation engine may comprise a processor, memory, internal busses and input/output equipment for exchanging information with PUs and with other nodes. Aggregation functions may be distributed over a number of physical nodes, collectively referred to as an aggregation engine.

Mapping Module

A mapping module is an entity capable of processing information related to real objects and to PUs. The mapping module computes links between the PUs relevant to a given real object. Links are computed so that they reflect, in graphs, dependencies (or relationships) that exist in the real world between elements or parts of real objects.

As an example in which the physical entity is an image, a group composed of a number of PUs representing a corresponding number of neighboring pixels on the image, may be strongly linked. If these pixels are of similar colors, a PU representing a pixel having a dominant color, expressed in a label of this PU, iteratively acquires a strong state and updates its linked PUs with its label. As a result, the PUs in the group may end up representing those pixels of the image as a single color cluster. A cluster of similar pixels forms a pattern that may be represented by a single PU. A graphical representation reflecting the structure of the image is simplified due to the clustering of similar pixels.

Referring now to the Drawings, FIG. 1 is an example of a sequence of steps of a method for providing a structural representation of a physical entity. Some or all of the steps within FIG. 1 may or may not be present in various embodiments. States and labels are assigned to PUs for representing physical entities, links are established between the PUs, and the states and the labels within the various PUs are updated based on other linked PUs.

In a particular embodiment, a sequence 10 is initiated by assignment 12 of a label representing an element of a physical entity, and a state, to one or more PUs, each PU initially representing one element. Links are defined 14 between PUs, for example between a first PU and a second PU. A strength of the link between the first and second PUs may be set 16 according to a relationship of respective elements within the physical entity. Alternatively, a common value for link strengths may be used and step 16 may be omitted. A mapping module determines, both initially and following iterations by an aggregation engine, the link strength between the first and second PUs. The aggregation engine is made aware of the link strength value.

The method may involve a plurality of PUs. Therefore, the state and the label of the first PU may be impacted by states and labels of all other PUs having links with the first PU. Alternatively, the state and the label of the first PU may depend on states and on labels of an elected set of PUs, the set being determined 18 before the further processing.

The states and the labels PUs are updated 20 through one or more iterations performed in the aggregation engine. For example, the state and the label of the first PU may be updated based on a state and on a label of the second PU, further based on the link therebetween. In an embodiment, updating the state and the label of the first PU comprises setting the label of the first PU to a value of the label of the second PU if the state of the second PU has reached a threshold, and if a sum of the state of the first PU and of a strength of the link between the first and second PU reaches the threshold. In another embodiment, updating the state and the label of the first PU at a given aggregation engine iteration may further be based on the state and the label of the first PU before the given iteration. Following the setting of the label of the first PU to the value of the label of the second PU, the method may comprise resetting 22 the state of the second PU.

Although an embodiment comprising a single iteration may be contemplated, a plurality of iterations performed in the aggregation engine for updating the states and the labels of the first and second PUs may provide an aggregation 24 of the first and second PUs if their labels have similar values.

At step 26, it may be discovered that labels are no longer being updated through subsequent iterations of step 20, or that a preset maximum number of iterations has been reached. Whether there has been a single iteration of a plurality of iterations of step 20, a structure of the physical entity is revealed, based on the link and on the labels of the first and second PUs, is as a graphical representation being formed at step 28.

In some variants, other steps of the sequence 10, possibly including all steps of the sequence 10, may be executed by or under the control of the aggregation engine.

Those of ordinary skill in the art will appreciate that the sequence 10 of FIG. 1 may be extended to include a large number of PUs for representing a large plurality of elements of the physical entity, the PUs having their respective states, with links established between many of the PUs. The foregoing description of the sequence 10 is simplified using a small number of PUs for the sole purpose of ease of illustration and should not be considered as limiting the present disclosure.

Figure 2:
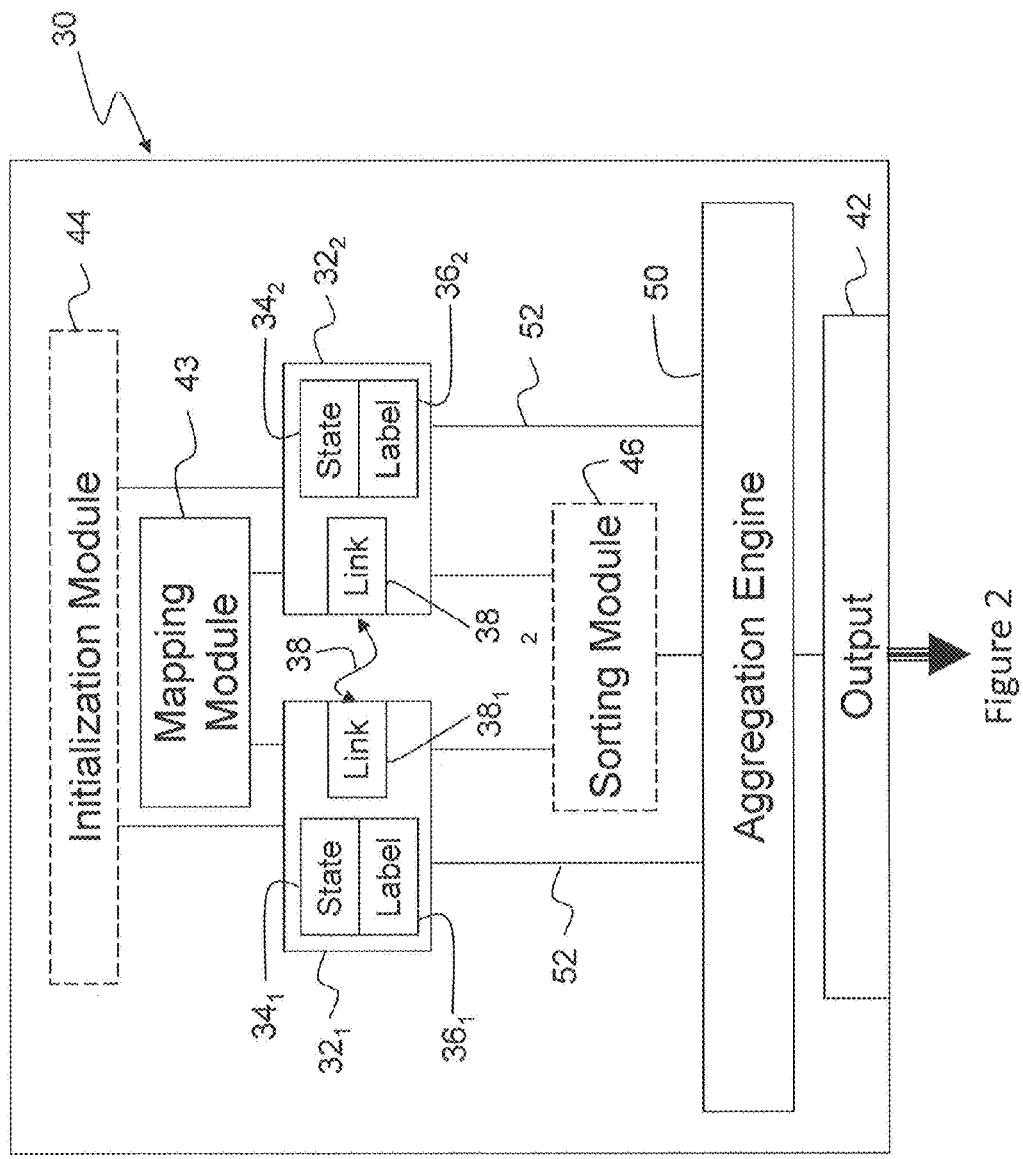
FIG. 2 is a schematic view of a system for providing a structural representation of a physical entity, according to an embodiment.

The present disclosure also introduces a system for providing a structural representation of a physical entity. FIG. 2 is a schematic view of a system for providing a structural representation of a physical entity, according to an embodiment. A system 30 comprises PUs $32_{1,2}$ having a processor (not shown) and a memory (not shown) for storing states $34_{1,2}$ and for optionally storing labels $36_{1,2}$. When present, the labels $36_{1,2}$ represent elements or parts of the physical entity. Links 38 are established between link elements $38_{1,2}$ of the various PUs $32_{1,2}$, during an initial mapping operation, which is described hereinbelow. An aggregation engine 50 is connected to the various PUs $32_{1,2}$ via an interface 52. The aggregation engine 50 provides exchange of information between peer PUs to update, through at least one iteration, the state $34_1$ and the label $36_1$ of a first PU $32_1$ based on a state $34_2$ and on a label $36_2$ of the second PU $32_2$, and further based on the at least one link 38. A mapping module 43 provides initial strength values of the links 38 and may update link strengths following iterations by the aggregation engine 50. An output 42 may present, for example on a display or on a printout, a graphical representation produced by the aggregation engine 50 to reflect a structure of the physical entity based on the at least one link 38 and on the labels $36_{1,2}$ of the first and second PUs $32_{1,2}$.

The system may further comprise an initialization module 44 for assigning initial values to the labels $36_{1,2}$ and to the states $34_{1,2}$ of the first and second PU $32_{1,2}$ before a first iteration by the aggregation engine 50. In a given iteration, the state $34_1$ of the first PU $32_1$ may be set based on the state $34_1$ of the first PU $32_1$ in a previous iteration, on the state $34_2$ of the second PU $32_2$, on a strength of the at least one link 38, and on features of the first and second PUs $32_{1,2}$.

Various types of structures may be graphically represented. As non-limiting examples, the structure may comprise an image, a video sequence, a sound sequence, a music sequence, a network, and the like.

In some embodiments, the PUs $32_{1,2}$ as well as the aggregation engine 50 may be realized at least in part as neurons of a neural network.

The system 30 may also comprise a sorting module 46. The sorting module 46 may determine, based on the labels $36_{1,2}$ and/or on the states $34_{1,2}$, at which upcoming iteration at least one of the first or second PU $32_{1,2}$ is expected to be updated. For this purpose, the sorting module 46 may comprise a memory tree (shown on later Figures), for example a binary memory tree, for sorting the states $34_{1,2}$ according to state priorities, in order to determine when at least one of the first and second PUs $32_{1,2}$ is expected to be updated.

In a variant, features of the mapping module 43, of the initialization module 44, of the sorting module 46, of the output 42, or any combination thereof may be integrated within the aggregation module 50. In another variant, the aggregation module 50 may control activation of the mapping module 43, of the initialization module 44, of the sorting module 46, of the output 42, these components being external to the aggregation module 50.

Non-Limiting Embodiment

The following sections of the present disclosure detail non-limiting embodiments of an Intelligent Graphical Aggregation System for Structure Recognition with Parallel Hardware and Computer Implementation.

Figure 3:
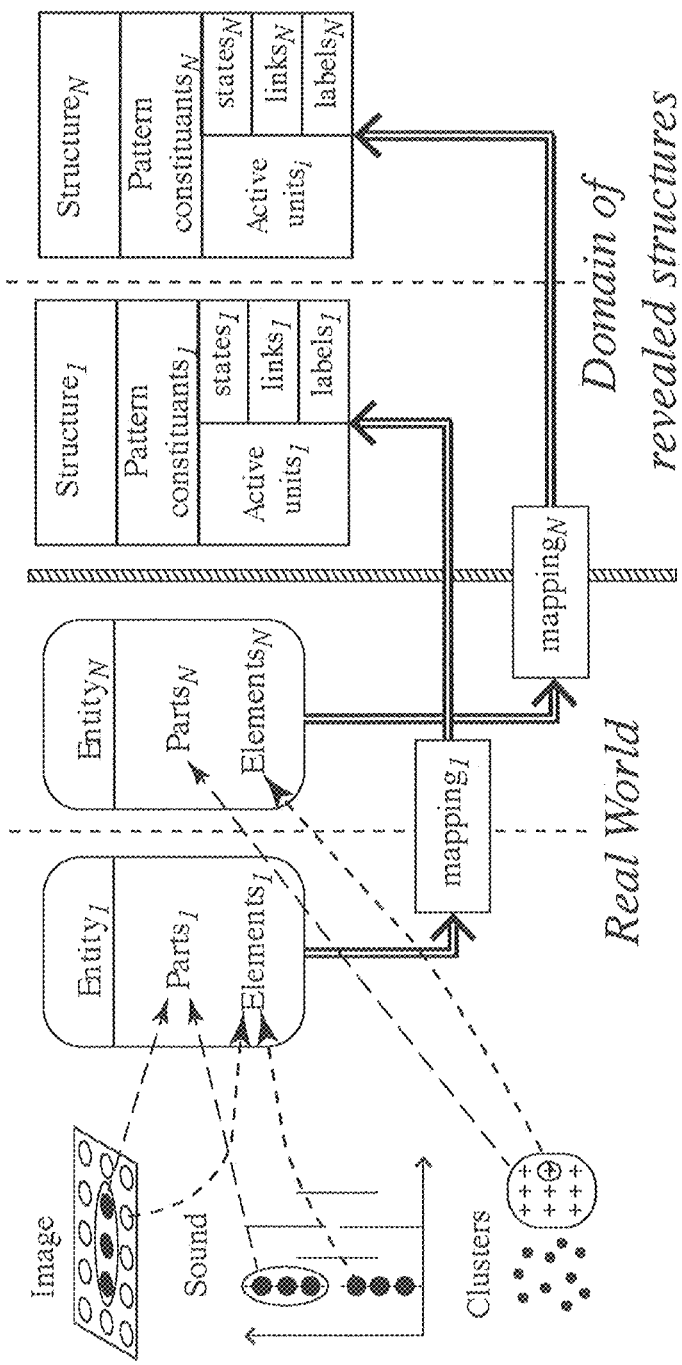
FIG. 3 is a global view of an example of a system for providing structure recognition.

FIG. 3 is a global view of an example of a system for providing structure recognition. The system of FIG. 3 can reveal structures of images, sounds or clusters of points.

The present disclosure introduces a system which:
1) Maps a real, physical entity with a representation that is used to find (reveal) the constitution of the physical entity;
2) Initializes processing units by setting state values and labels;
3) Lets the active processing units iterate and update their state and label through an aggregation engine; when needed, the aggregation engine may also use a sorting module; sorting is based on states and labels of the processing units;
4) Reorganizes the representation (labels, states) and links (between patterns and graphs) and goes back to item 3) or goes to next step to reveal the internal structure; and
5) Outputs the labels, revealing the internal structure of the physical entity.

FIG. 3 is an example of the complete system.

Description of the Non-Limiting Embodiment

Entities and Graphs

Figure 4:
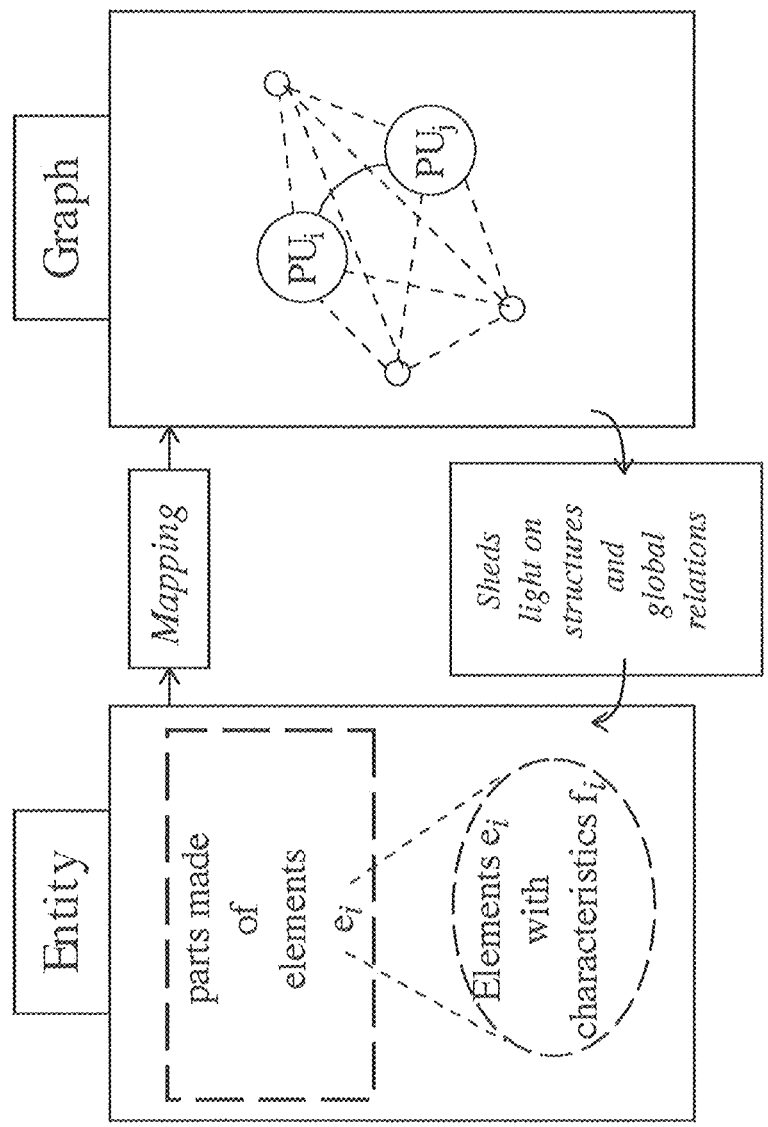
FIG. 4 shows a mapping between an entity and a graph.

FIG. 4 shows a mapping between an entity and a graph. The entity belongs to the real world and is mapped into a graph. The graph sheds light on the structure and on the global relations between parts or elements from the entity. The graph can assist the system of FIG. 3 in revealing structures and global relations.

A system is presented that encodes and represents entities taken from the real world by graphs where vertices are processing units $PU_i$ and edges are links $l_{ij}$ which connect processing units $PU_i$ and $PU_j$. It may be mentioned that vertices are data structures that may represent a point in a two (2) or three (3) dimension space such as in a graph. The graphs are dynamic and reconfigurable depending on the problem at hand. Graphs find (reveal) the constitution and/or the relationship of entities. An entity is a set of parts made of simple elements. For example, an image is an entity that is made of parts (segments) that are sets of pixels. At some moment t, a sound is a set of sources (parts) that comprises specific frequency components (elements). A text document is made of words (elements) which may be grouped by topics (parts) in order to identify semantic meaning.

Graphs of Processing Units

Figure 5:
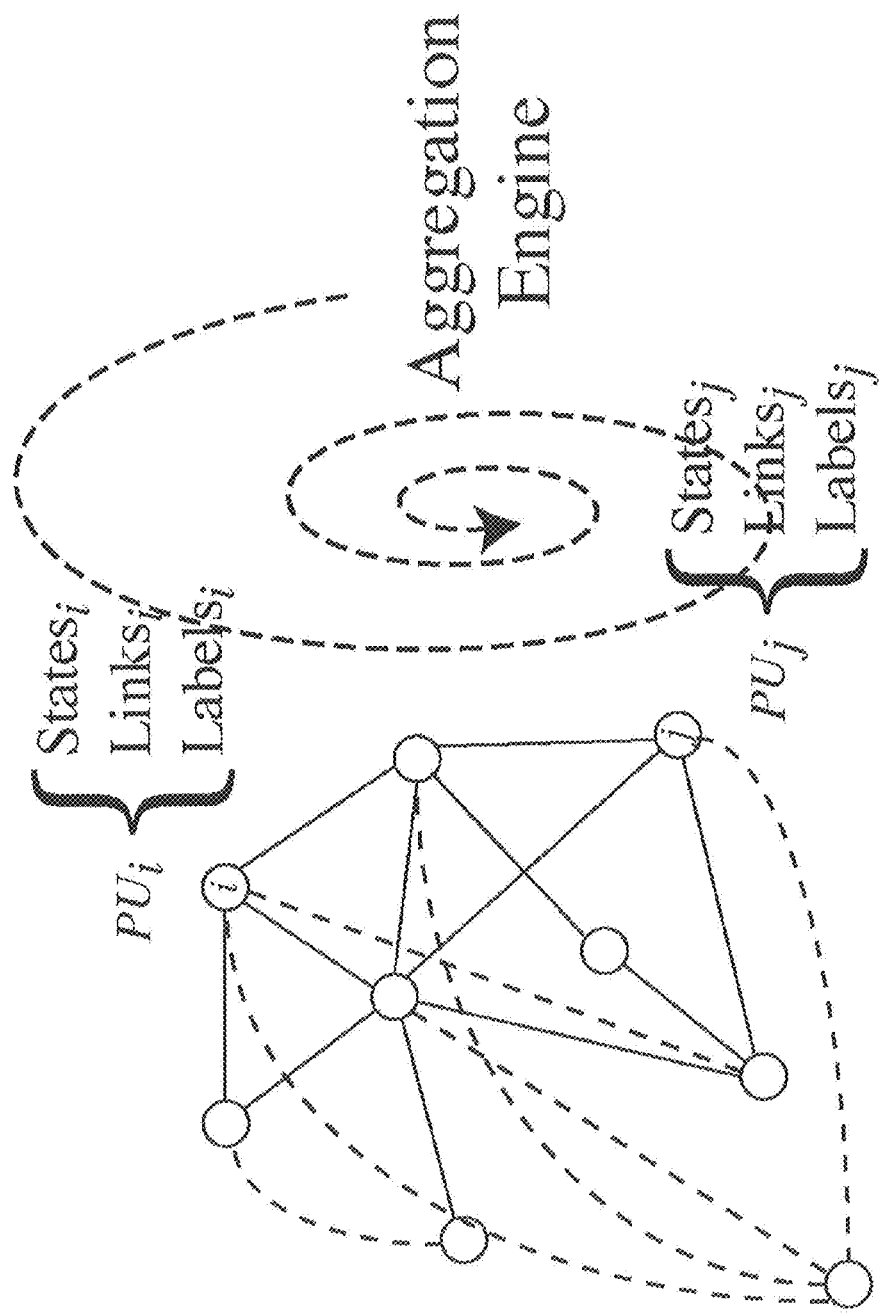
FIG. 5 shows graphs of processing units.

FIG. 5 shows graphs of processing units.

Each processing unit has a state value and a label. The processing units iterate and update their state and label through the aggregation engine. States and labels of processing units tend to cluster and create groups of processing units which share the same state values or labels. Through these groups of PU, patterns and structures appear and reveal internal characteristics or relations of entities.

Mapping Between Real World and Graphs

Figure 6:
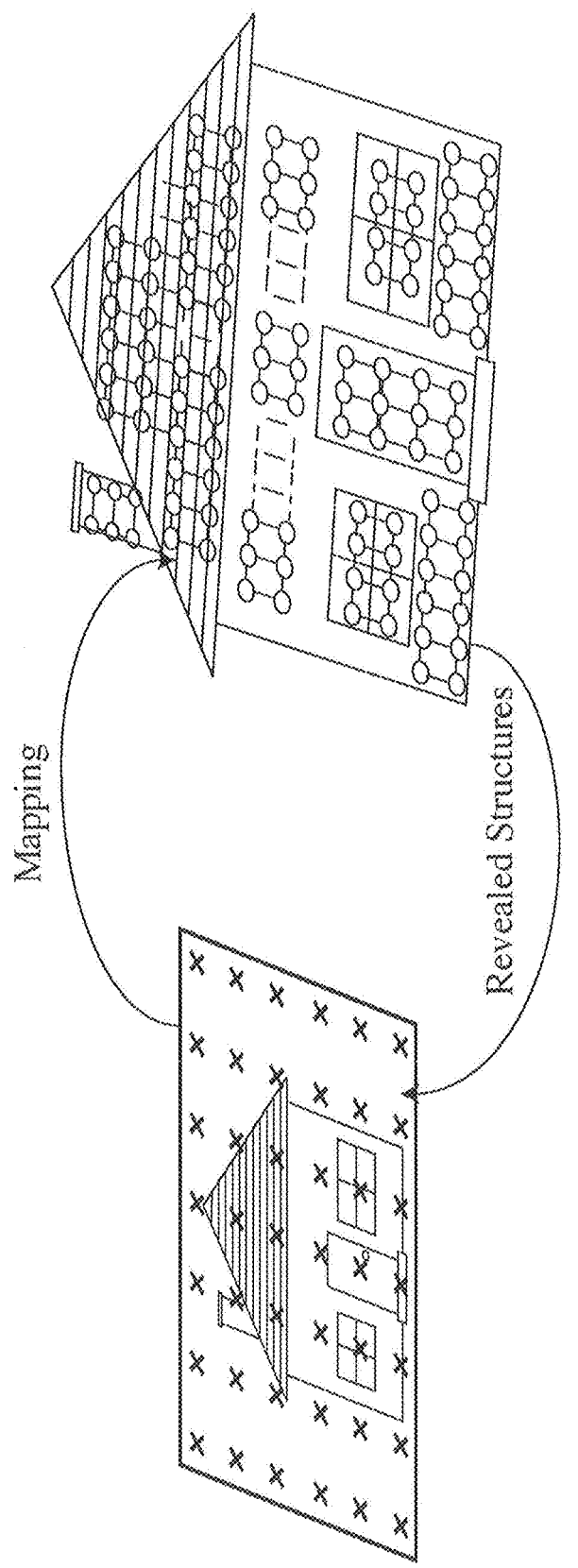
FIG. 6 shows a mapping between real world and graphs, illustrated for an image entity.

FIG. 6 shows a mapping between real world and graphs, illustrated for an image entity. On the Figure, instances of "x" represent elements of an image (on the left) whose input features are pixel values. Parts may be understood as sets of elements that may share, for example, common features. In this situation, parts are segments of the image. An image of the illustrated house is mapped on the graph (on the right), from which patterns of activity emerge. These patterns on the graph reveal structures of the image of the house. Circles represent processing units. Processing units that are strongly connected belong to a same sub-graph. Processing units that are not interconnected belong to different sub-graphs. Each sub-graph reveals a structure from the input image, for example a door, a window, a roof, and the like.

Figure 7:
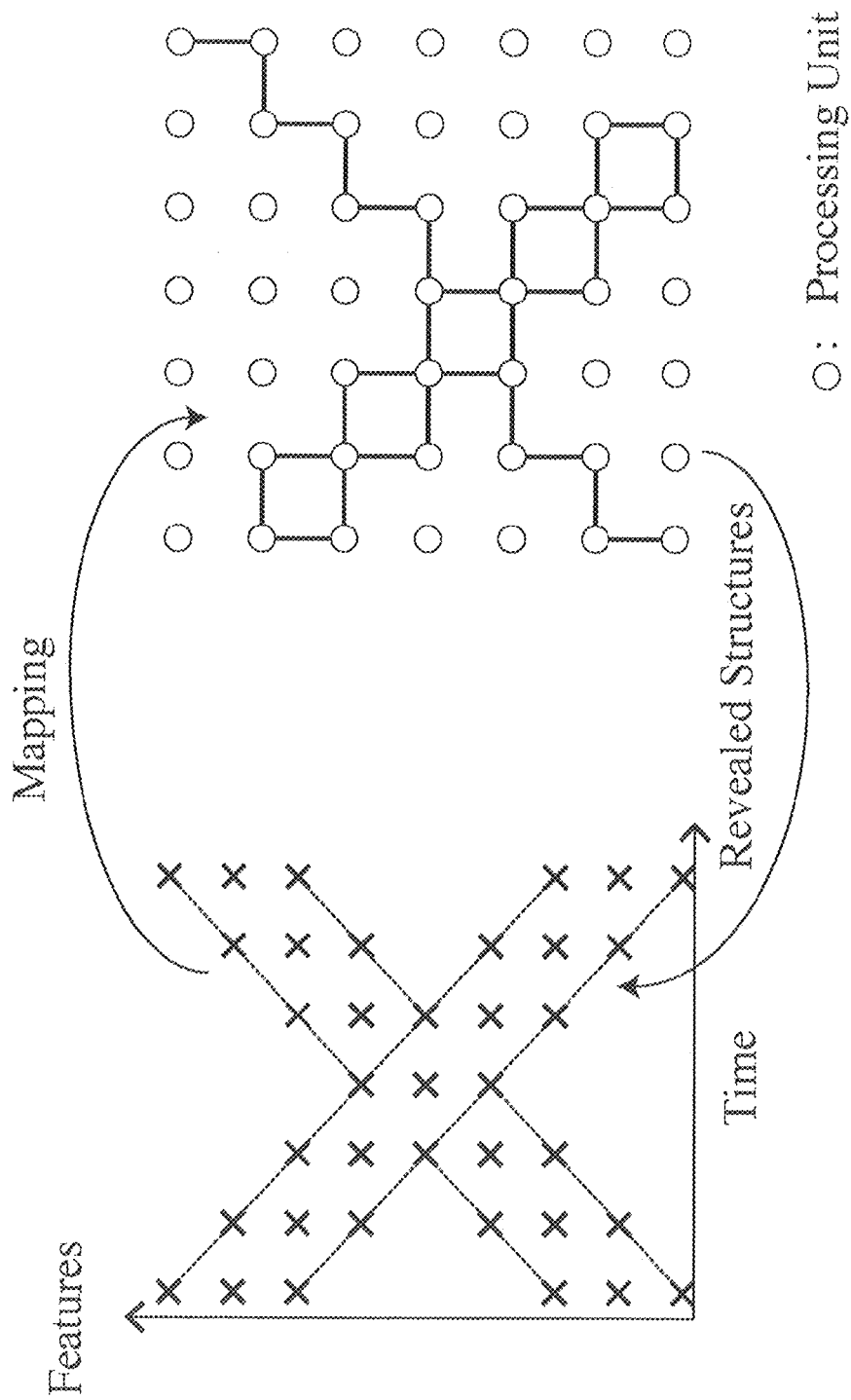
FIG. 7 shows a mapping between real world and graphs, illustrated for a sound entity.

FIG. 7 shows a mapping between real world and graphs, illustrated for a sound entity. Left section may for example represent a cochleogram, or may alternatively correspond to any spatio-temporal representation of sounds, that comprises two parts (because of two interacting sound sources). One is decreasing in frequency (or in a spatial scale) and the other is increasing in frequency (or the spatial scale). Patterns in the equivalent graph reproduce the feature distribution of the two sound sources. Features $f_i$ here correspond to a combination of energy and frequency (or spatial scale values), as a non-limiting example $f_i$ may be a combination of energies at the output of cochlear filters (or after projection on elementary scale signals).

Mapping between entities from the real world and graphs is done in the mapping module 43 by computing links between processing units relevant to a given real object. Links are used by the aggregation engine to update the state of processing units. Links are computed so that they reflect, in graphs, dependencies (or relationships) that exist in the real world between elements or parts of entities. To reveal the internal structure of the entity, links may be computed based on the characteristics (or features) of the entity. As a non limiting example, an image is represented as a set of processing units which are linked depending on the features in the image (FIG.

6). As a non-limiting example, a telecommunication network is represented as a graph where processing units are linked depending on the bandwidth (or on the workload) between telecommunication nodes. A sound is represented as processing units where the graph encodes the spatio-temporal distribution of feature coefficients. Each processing unit is associated with a specific range of frequencies (or of spectro-temporal features), FIG. 7. Links are a mean to encode local characteristics and relations between elements in the real world so that graphs reveal global organization which appears because of local interactions between nodes of graphs. The system is not limited to mapping one entity to a single graph. Many entities may be mapped to many graphs, and graphs may be connected. In the real world, image features are not directly mappable onto features of sound. But with the system, an image graph may be mapped with a sound graph. This may be done by defining the $I_{ij}$ between the two graphs.

Aggregation Engine

Figure 8:
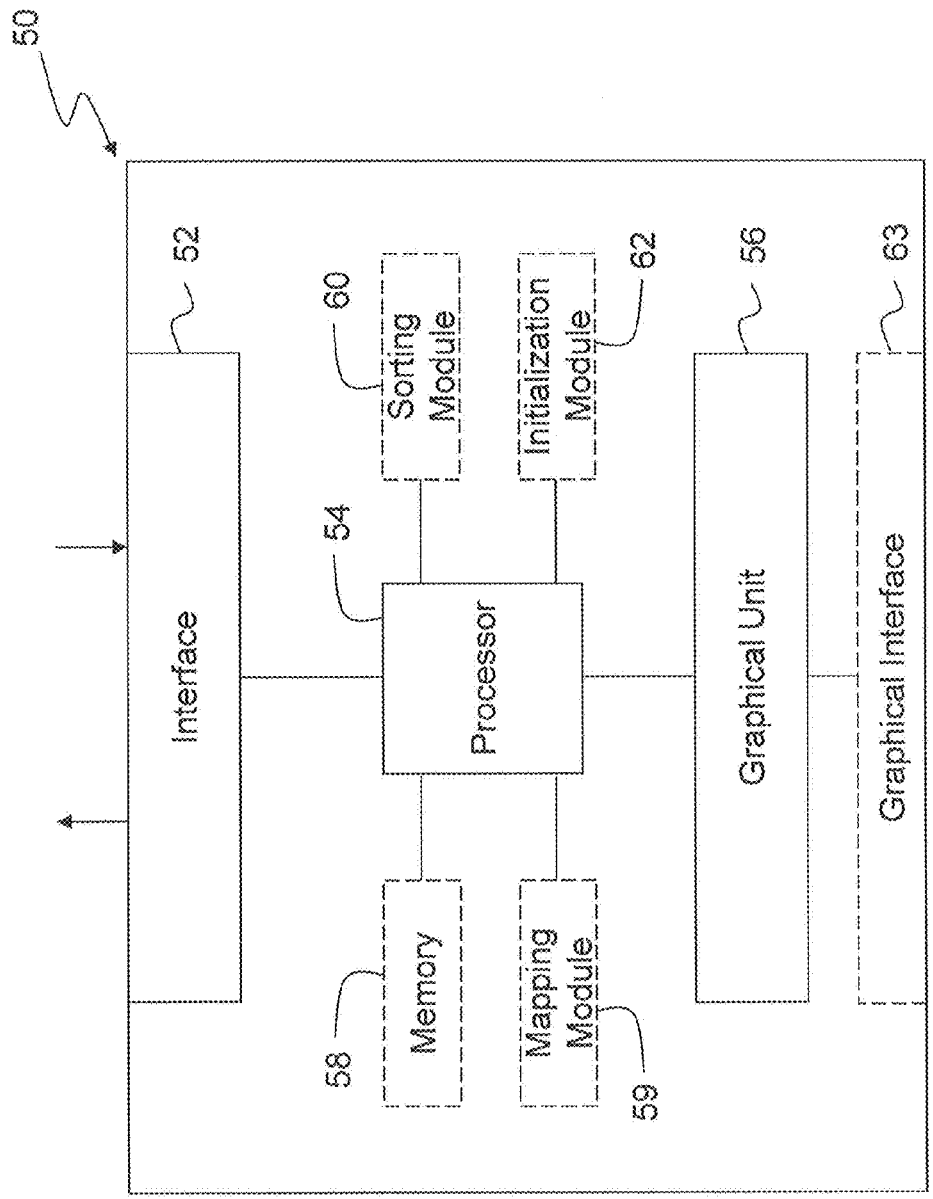
FIG. 8 shows an aggregation engine according to an embodiment.

FIG. 8 shows an aggregation engine according to an embodiment. The aggregation engine 50 comprises an interface 52 for communicating with a number of connected processing units, a processor 54, a graphical unit 56, and may further comprise a memory 58, a mapping module 59, a sorting module 60, an initialization module 62, a graphical interface 63, and like components. The processor 54 updates, through one or more iterations, states and labels of the connected processing units based on states and labels of other processing unit having links therewith. Initial state and label values for the processing units may be obtained by the processor 54 from the initialization module 62 or from an external initialization module 44, shown on FIG. 2. Initial and update link strength values may be obtained by the processor 54 from the mapping module 59 or from an external mapping module 43, shown on FIG. 2. Regardless, the processor 54 remains aware of link strengths for the connected processing units. The graphical unit 56 produces a graphical representation of the physical entity based on the links and on the labels of the processing units. The graphical interface 63 may provide a visual display or a printout of the graphical representation. The memory 58 may store values of labels, states and links associated with the various processing units. The mapping module 59 may initialize and update link strengths between various processing units, as described hereinbelow. The aggregation engine 50 may further implement any or all of the features attributed to the aggregation engine introduced in the foregoing description of FIGS. 1 and 2. In an embodiment, the aggregation engine 50 may be realized as a neural network.

Figure 9:
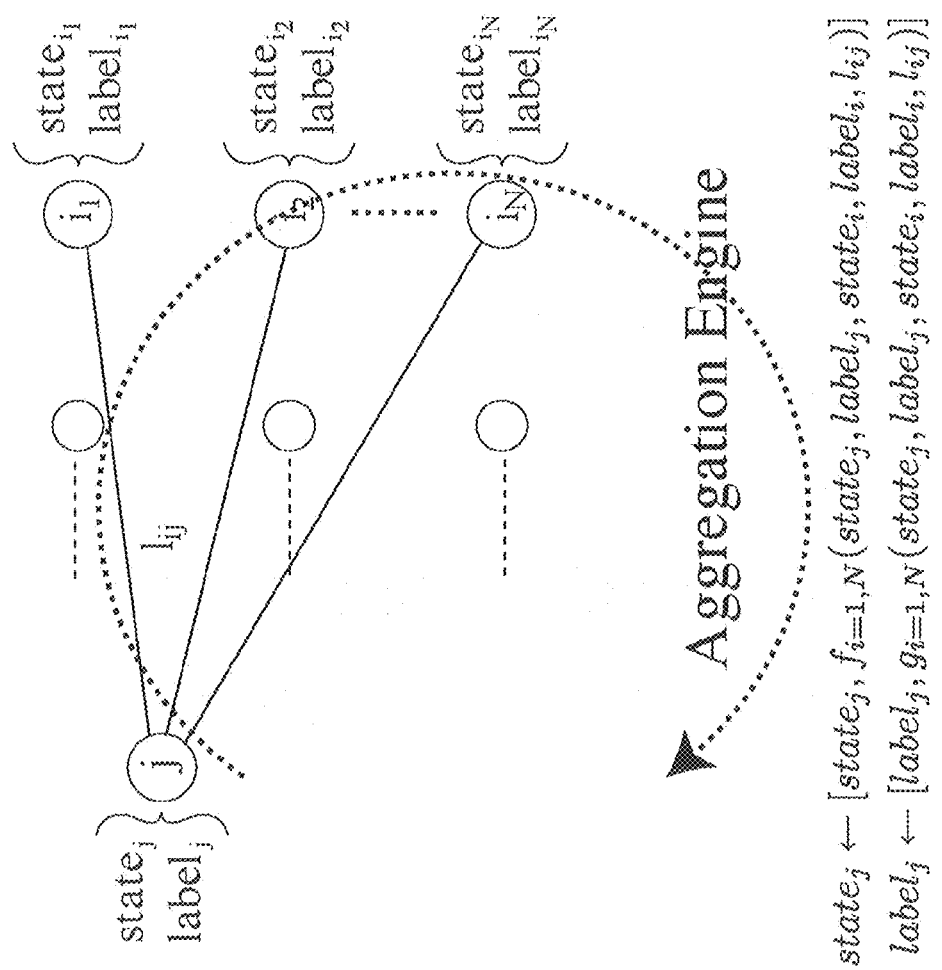
FIG. 9 shows a process executable within the aggregation engine of FIG. 8.

FIG. 9 shows a process executable within the aggregation engine of FIG. 8. The label and state of processing unit $PU_j$ are updated by adding up contributions coming from other processing units $PU_i$ and by processing labels. The round arrow represents iterations within the aggregation engine.

Processing units are characterized by three elements of information: $state_i$, $label_i$ and links. The latter may be formed as a vector of individual components $I_{ij}$ which are first defined, created and computed during the mapping operation. The system comprises the aggregation engine, preceded by the mapping which prepare real world data for the aggregation engine and followed by a post-treatment which transforms the aggregation engine results into data usable in the real world.

The aggregation engine reveals the internal structure of any entity that may be represented as a set of subsets (parts) of points (elements) with a feature vector assigned to each point (element). It performs the update of each processing unit, then graphs may be reconfigured and links $I_{ij}$ may be updated by taking into account new state values $state_i$ and the resultant patterns (FIG. 9). When needed, and depending on the configuration in use, the aggregation engine may also use a sorting module, described hereinbelow in section "Implementation of a Charging Curve for Discrete PU and Sorting Process with Organized Heap Queue" to retrieve the time at which a processing unit is expected to be updated.

Remapping, Patterns and Graph Update

Figure 10:
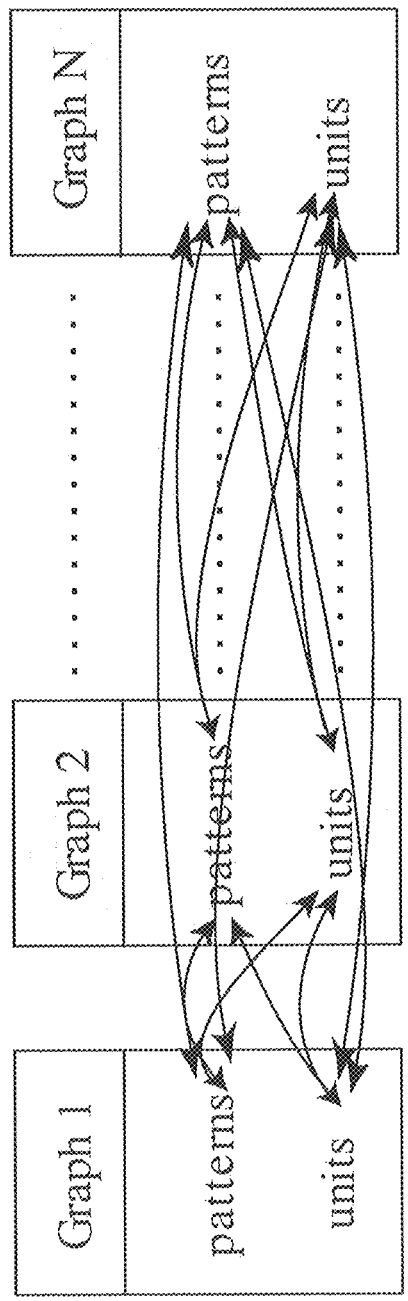
FIG. 10 shows a mapping update and multi-graph aggregation.

FIG. 10 shows a mapping update and multi-graph aggregation. New links may be established between patterns and units, whether they are in the same or a different graph. A unit in one graph may be mapped on patterns from another graph. That unit may be said to modulate the pattern activities inside the other graph because of feedback between graphs. When patterns from a graph project into a single unit of a graph, this single unit is said to represent the complex structure of the patterns from the other graph.

Figure 11:
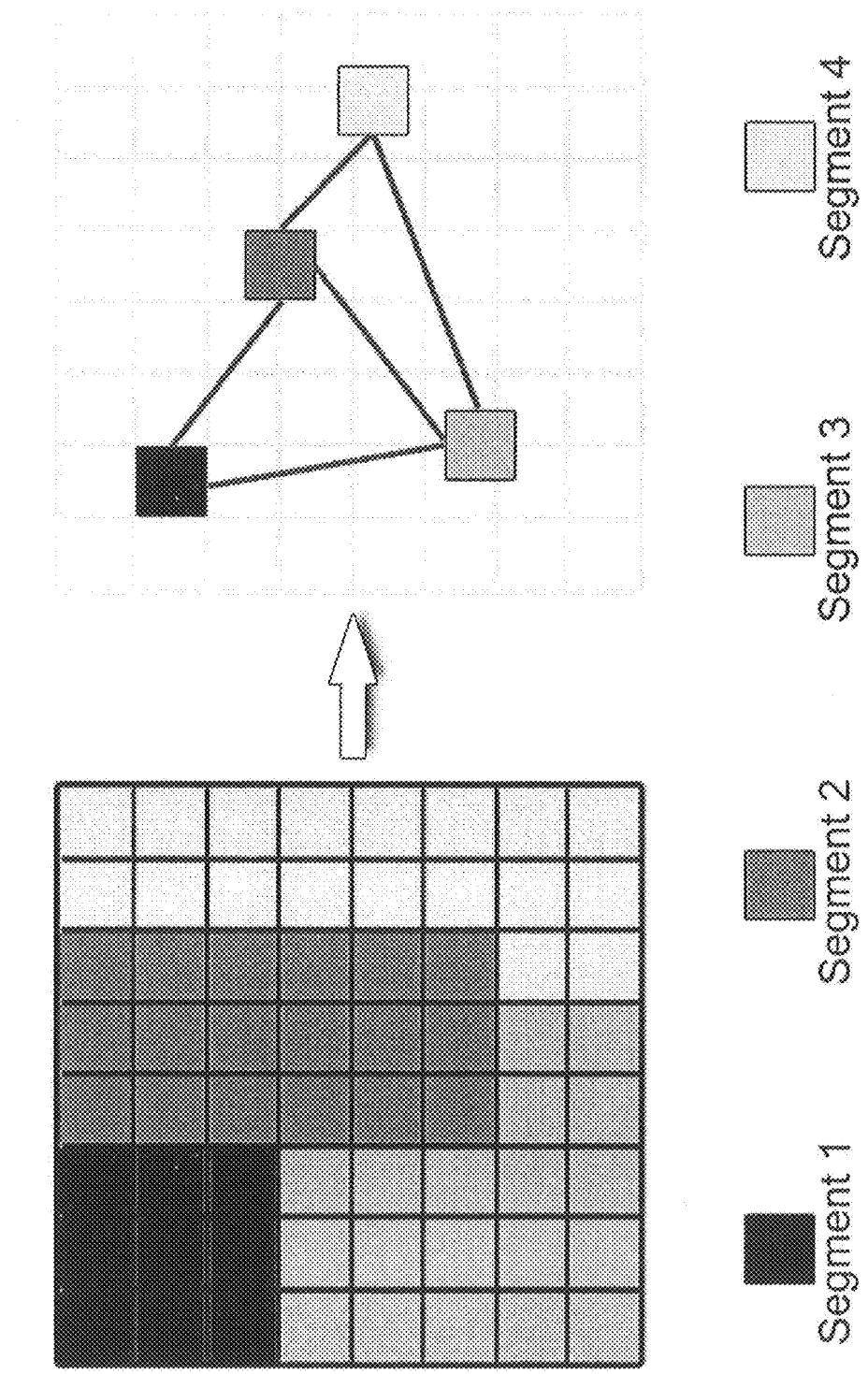
FIG. 11 is an illustration of remapping.

FIG. 11 is an illustration of remapping. An initial graph that comprises 64 processing units is transformed into another graph in which the 64 processing units are represented by 4 processing units. New links are established (represented by use of thin straight lines between the segments, on the right hand side of FIG. 11). In the situation of image processing, the 4 patterns from the graph at left would be segments and the 4 processing units in the graph at right represents the structure of the objects that is made of the 4 segments.

Figure 12:
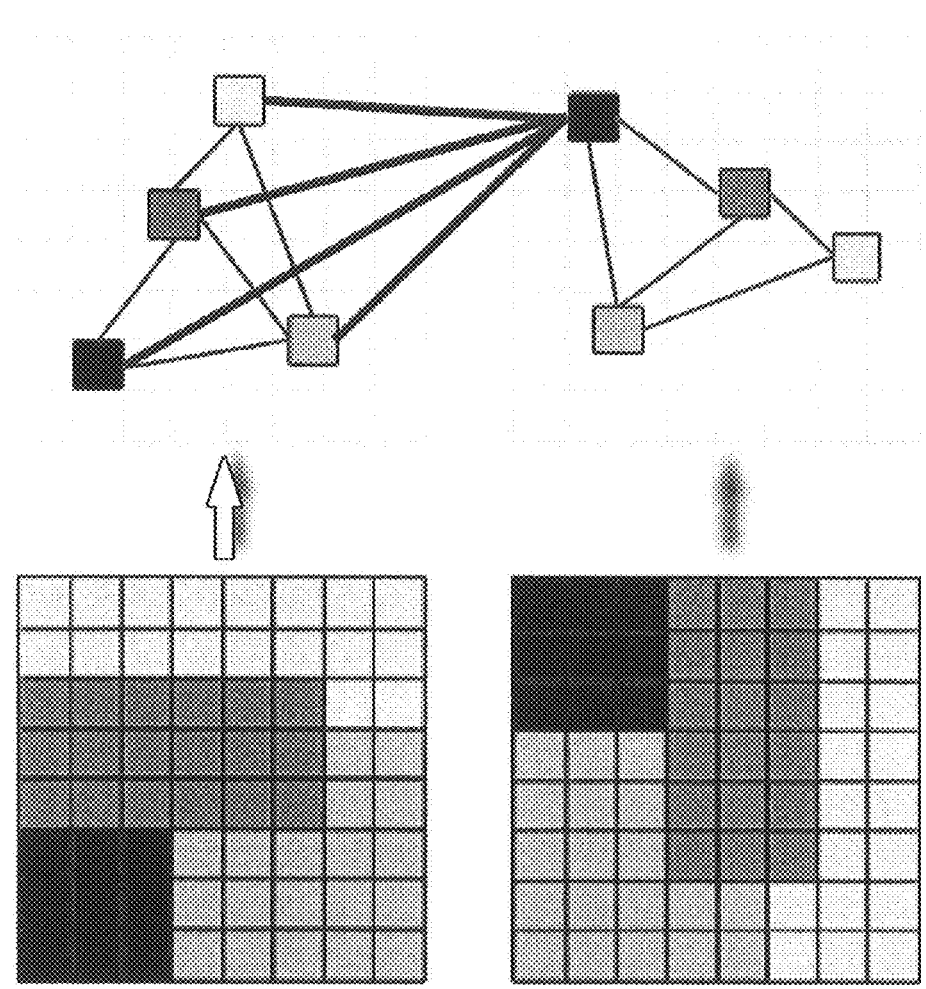
FIG. 12 illustrates a remapping with 8 patterns when two graphs were already connected.

FIG. 12 illustrates a remapping with 8 patterns when two graphs were already connected. Internal links of each graph are illustrated in by use of thin straight lines between the segments, on the right hand side of FIG. 12, while the external links between graphs are represented using thicker straight lines. A single set of external links is illustrated. In practice, external links may exist between any couple of patterns (represented on the right side of FIG. 12 as a processing unit, on the left side by pixels with same gray levels).

At any time, the aggregation engine may be stopped to reconfigure the mapping based on the activity in the graphs. New links $I_{ij}$ between groups (patterns) and/or graphs of processing units may be set. Older links may be destroyed (FIGS. 10, 11 and 12). Mapping may be updated to take into account the new patterns that appear in graphs while the aggregation engine is running. A set of processing units is then replaced by fewer units. FIG. 11 is an illustration for 4 patterns appearing in the first graph that are replaced with 4 processing units in the second graph. FIG. 12 illustrates the remapping and graph updates when two graphs were initially connected—the matching mode between two graphs would have this configuration. Patterns in the two initial graphs are represented in the same manner than before in the two new graphs. The two new graphs are connected with external links $I_{ij}$ computed according to one of the equations from section "Mapping between entities and aggregation structures" presented hereinbelow. Again the 2 graphs in the right hand of FIG. 12 represent the structure and/or the relationship of the 8 patterns from the left hand of FIG. 12.

Processing Unit Types

Two types of processing units are used: continuous $cPU_i$ and discrete $dPU_i$. Discrete processing units may be active or passive. Processing units perform elementary computations and may be characterized by two variables: $state_i$, $label_i$ and one vector of $links_i$. $I_{ij}$ are the components of vector $links_i$. Continuous processing units do not have labels while discrete processing units have labels.

In an embodiment, every processing unit consistently executes the same operation. From equations 1 and 2, $state_i$ (or $state_j$) is updated by adding the contributions of the other processing units $PU_j$ (or $PU_i$) it is connected to.

Continuous Processing Units

Figure 13:
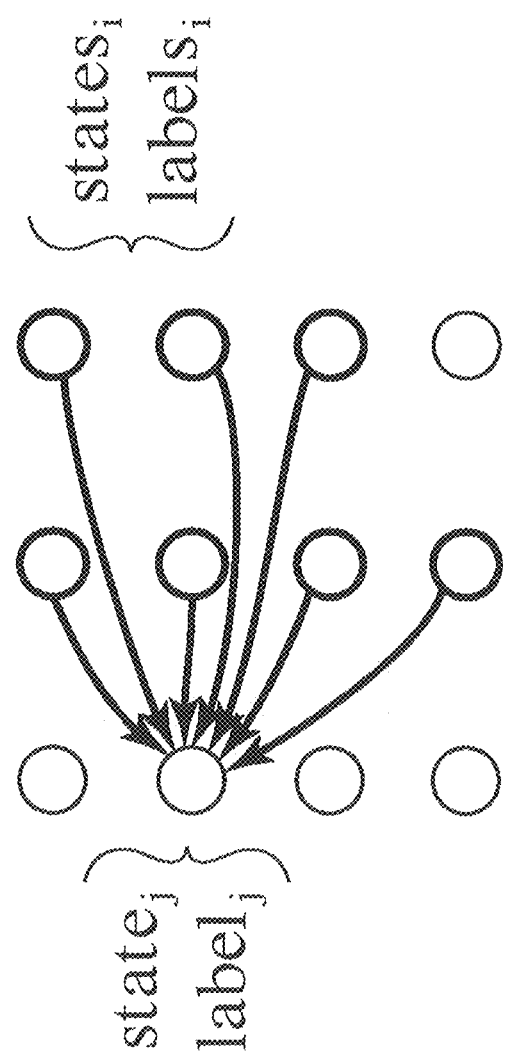
FIG. 13 shows a convergent Processing Unit.

FIG. 13 shows a convergent Processing Unit. $cPU_j$ is the receptor of the continuous information sent by units $cPU_i$.

$$state_j \leftarrow state_j + \sum_i state_i \times l_{ij}(s_i, f_i; s_j, f_j) \quad (1)$$

for continuous $PU(cPU)$

The contribution of a continuous processing unit $cPU_i$ is equal to the product of its state $state_i$ and link $I_{ij}$ (link from transmitters $cPU_i$ to the receptor $cPU_j$). A continuous $cPU_j$ receives contributions from all $cPU_i$ it is connected to (contributions from $cPU_i$ are convergent on $cPU_j$), FIG. 13. The output states are first a continuous linear function of input states (according to equation 1) and are then normalized and thresholded. Details are provided hereinbelow, in section "Continuous aggregation engine process". This normalization followed by thresholding provides the nonlinear properties.

Discrete Processing Units

Figure 14:
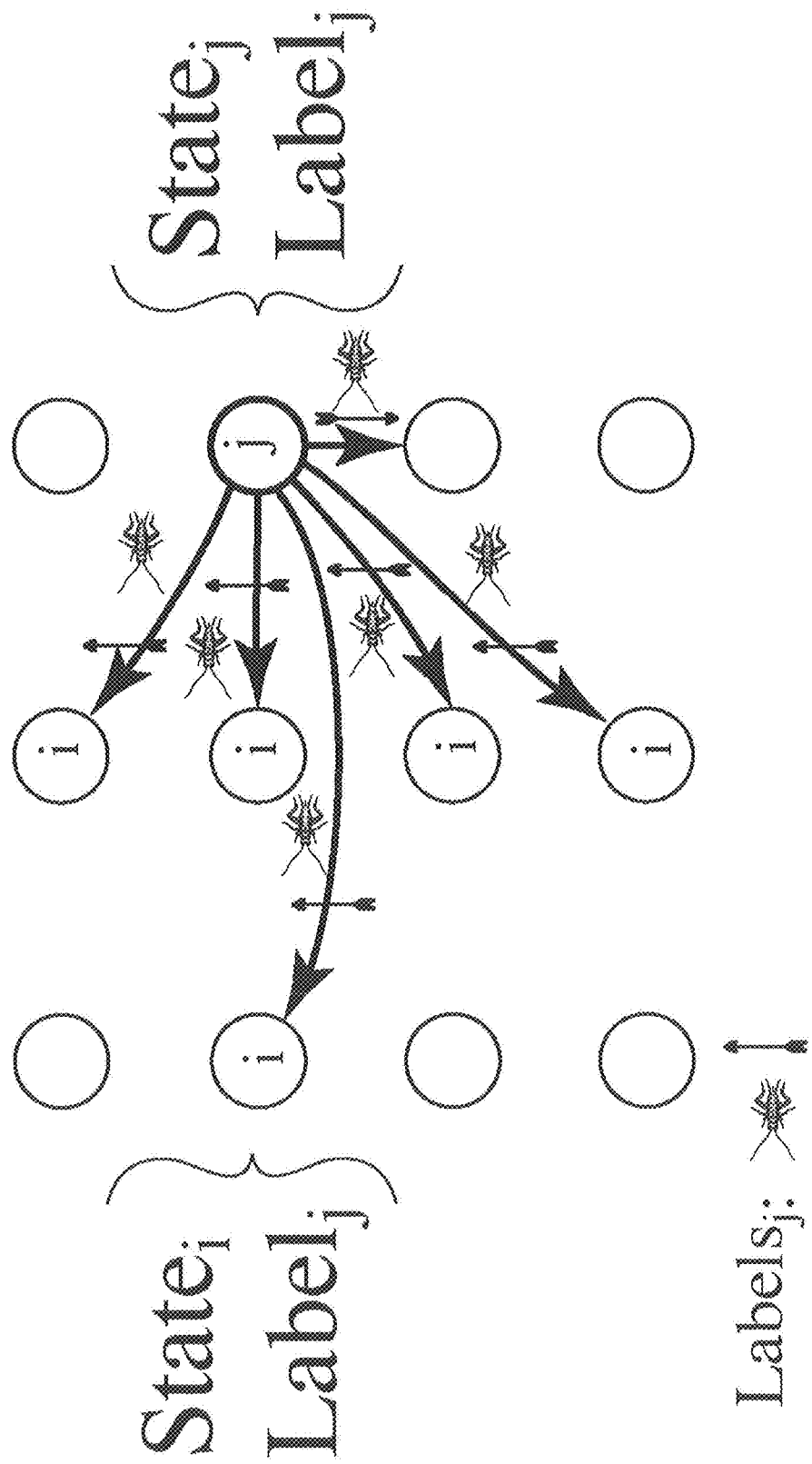
FIG. 14 shows a divergent discrete processing unit.

FIG. 14 shows a divergent discrete processing unit.

$$state_i \leftarrow state_i + \sum_{j=\in ElectedSet} l_{ji}(s_j, f_j; s_i, f_i) \quad (2)$$

for discrete $PU(dPU)$

A discrete processing unit is elected if its state value or label carries out a specific relation. For example, a processing unit may be elected if its state value is greater (or smaller) than a predefined threshold. Once the threshold is reached by the state variable from $PU_j$, $PU_j$ is said to generate an event. The event may be a flag (illustrated as vertical arrows on FIG. 14) or a specific number (illustrated as crickets on FIG. 14) or a sequence of flags (arrows) and numbers (crickets) that are emitted by the processing unit. Two election mechanisms are detailed, hereinbelow, in section "Event generation". A discrete $dPU_i$ receives contributions from elected $dPU_j$ and broadcasts (when elected) to all other $dPU_i$ it is connected to (divergent contribution, FIG. 14). When elected, the contribution of a discrete processing unit $dPU_j$ is equal to link $I_{ji}$. ElectedSet is the set of units $dPU_j$, projecting on unit $dPU_i$, which have been elected.

In a variant, continuous processing units (cPU) and a first configuration of the aggregation engine may first be used to locate most significant features from one entity. This is done by associating one sub-graph to that input entity. This may form an optional initialization step. Once these most significant features have been located with that first configuration of the aggregation engine, another configuration may be run, this time by using discrete processing units (dPU). Labels are then distributed by the aggregation engine so that the PU states and labels may cluster. This clustering step may be also done by associating one sub-graph to the actual input entity. The initialization step and the clustering step may be repeated as many times as the number of entities to be compared. FIG. 3 illustrates a result of the clustering step for N input entities. Once all N sub-graphs have been generated, they may be connected as shown on FIG. 10. This new configuration may be processed by the aggregation engine to reveal common sub-graph structures. Finally, a score may be generated to characterize the degree of matching between sub-graphs.

Mapping Between Entities and Aggregation Structures

As shown in FIG. 3, mapping in the mapping module between real world (the application in hand), and the representation that is manipulated by the aggregation engine, uses the input characteristics (or features) to compute links $I_{ij}$ between processing unit i and processing unit j. Links $I_{ij}$ impact strongly the dynamic of the system that comprises the processing units (states, links and labels). A description of different type of mappings that the present system may handle is provided below.

Weakly and Strongly Linked Processing Units

Because of the non-linear dynamic of the processing units, the system may have a complex non linear dynamic and many attractors. Therefore, the mapping is designed so that the aggregation engine reveals quickly structures from the real world. When links between processing units are weak, interaction between processing units is comparable to a "gas" with weak interaction between the molecular elements. The update of states and labels of processing units is then slow and diffusive. If the processing units are strongly linked, the dynamic is much simpler. The system is like a "solid" with strong interactions between the molecular elements (Processing Units). The behavior is mostly oscillatory if the initial conditions and setup are correct. The update of Processing Units is very fast (quasi-instantaneous).

How to Setup and Define Links $I_{ij}$ Between Processing Units

Links are chosen so that processing units that characterize a same part or property of an entity are strongly linked and have a dynamic close to that of solids. It means that the processing units are so tightly interrelated that they are close to the same state value. On the other hand, processing units that do characterize a different part or property of an entity may not share the same state values. The interaction between these units is a kind of slower and diffusive process (as for gas). To summarize, the system has a complex and rich dynamic that may be balanced between a fast and slow interaction between units. These operation modes and the balance in the nature of the interactions are defined by the strength of the links between units.

In the following, links are described and illustrated to map real world with the internal representation used by the aggregation engine.

Links may be distributed in such a way that there exists a good balance between weak and strong links for a given entity.

Example of Mapping Functions

Symmetrical Mapping Example

Figure 15:
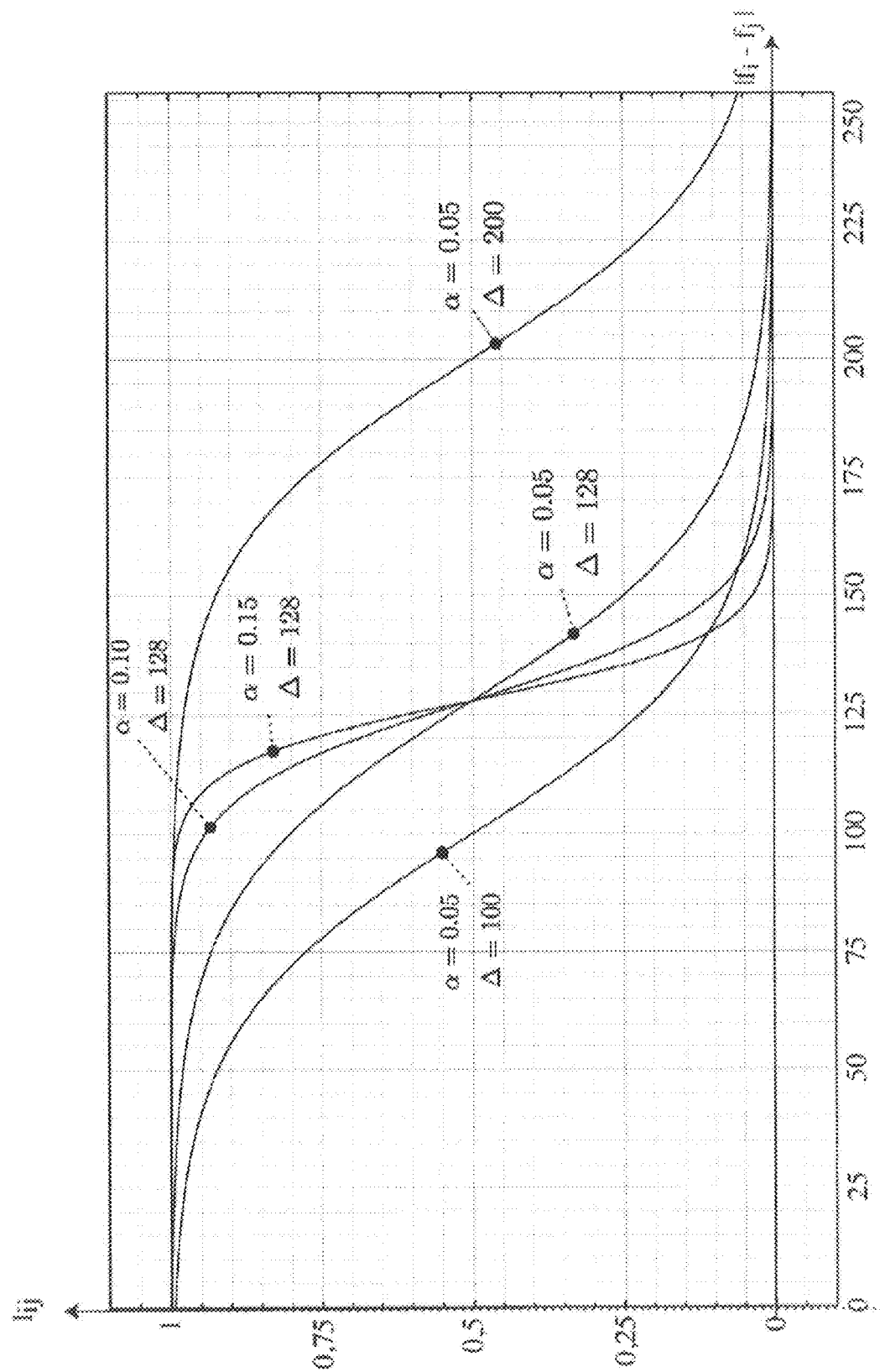
FIG. 15 is an illustration of a link $I_{ij}$ function.

FIG. 15 is an illustration of a link $I_{ij}$ function. The horizontal axis corresponds to a function of entity features ($f_1$ and $f_2$) that are measured in two elements ($e_1$ and $e_2$) of an entity. The vertical axis corresponds to the link strength $I_{ij}$ between processing unit i and processing unit j.

The transformation as presented in FIG. 15 is an illustrative mapping, in which equation is:

$$l_{i,j} = 1 - \frac{1}{1 + e^{-\alpha(|f_i - f_j| - \Delta)}} \quad (3)$$

On FIG. 15, $\alpha=0.1$ or $0.05$ or $0.15$ and $\Delta=100$ or $128$ or $200$ and the abscissa variable is $|f_i - f_j|$ Distance Mapping Example Processing units have an internal state variable s and a set of links $l_{ij}$ with other units. The link $l_{ij}$ between processing unit i and processing unit j could be a measure of the distance between the features f of their associated input elements e such that $l_{ij}=h(f(i)-f(j))$. An example of a function which yields bidirectional, symmetrical links between units i and j is given in equation 4.

$$l_{ij} = \frac{1}{|f(i)-f(j)|} \quad (4)$$

If the inputs have several features, multiple links may be established between two units. Combination of features may also be encoded in the computation of links.

Multi-Level Mapping

For now, links $I_{ij}$ mirror in graphs the dependence that exists in real world between features or properties f of elements e from entities.

Other kinds of links are also used in the system. These links are computed during reconfiguration of graphs after iterations of the aggregation engine. Once patterns of activity have appeared in graphs (as example: groups of processing units with same labels), it is a good practice to represent patterns with fewer processing units. Patterns of processing units are made of PUs that have same labels. Instead of keeping all processing units in graphs, pruning is used. Groups of individual PUs that belong to same patterns are replaced with a smaller set of PUs. Labels, states and links of these new smaller sets are then newly computed. Usually they inherit labels and states from the PUs of the pattern. New links are also computed. For this, features or properties are associated to the new patterns. If features or properties of patterns are of the same nature (same kind), new pattern features or of properties may be obtained, for example, by averaging over values of $f_i$ from the set of elements that is equivalent in the real world to the considered pattern in the graph (for example, averaged pixel values). On the other hand, patterns that appear in graphs may be characteristic of complex features that are not present in the original real world. This happens with the system when connecting graphs which represent different entities (for example by connecting one graph of an image with another graph that represents a sound). FIGS. 10, 11 and 12 show how a new mapping may be done between graphs, patterns and units. It may be observed that patterns in one graph may be mapped to single units in another graph. This is an efficient way to represent for example objects or concepts whether the architecture is hierarchical or not.

Other Mappings

A Balance Between Negative and Positive Links

Instead of using links that are consistently positive (as in previous examples), the system may also use negative links. It has the advantage to force processing units that belong to a different pattern not to share the same state or label. The discrimination between patterns is increased.

Three Level Mappings

Figure 16:
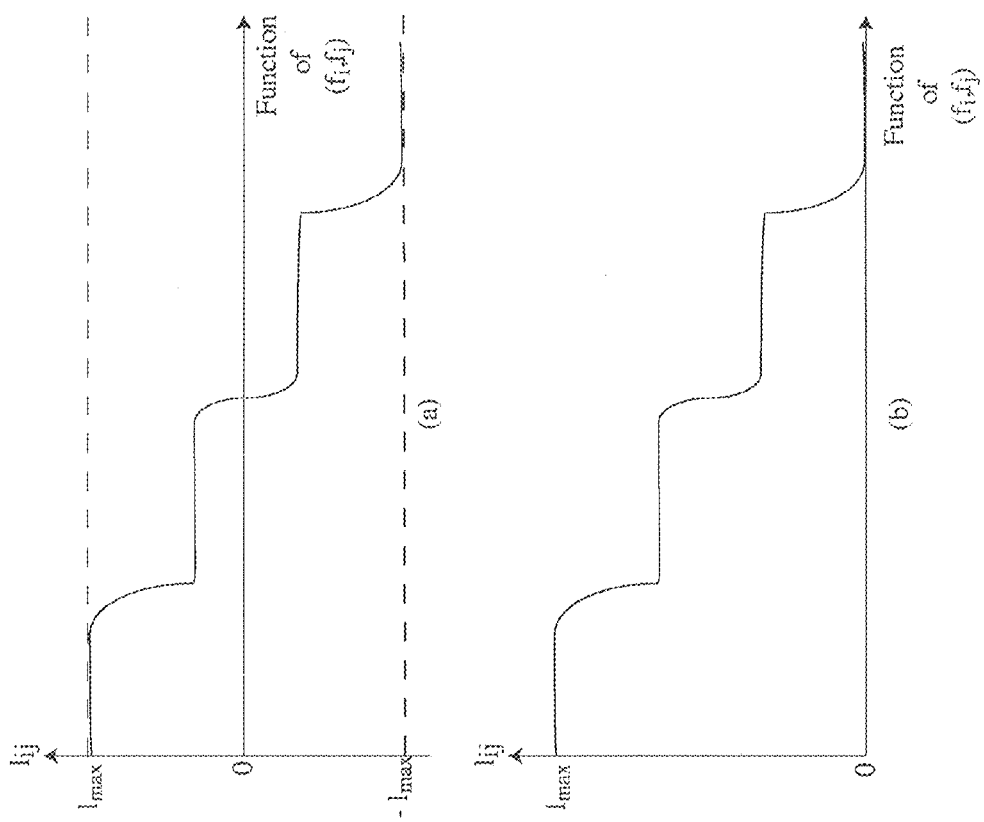
FIGS. 16a and 16b provide other illustrations of link $I_{ij}$ functions.

FIGS. 16a and 16b provide other illustrations of link $I_{ij}$ functions. The horizontal axes correspond to functions of entity features/properties ($f_1$ and $f_2$) that are measured on two elements ($e_1$ and $e_2$) of an entity. The vertical axes correspond to links strengths $I_{ij}$ between processing unit i and processing unit j. Two functions have been reported: FIG. 16b shows a function that solely uses positive links while FIG. 16a shows a function that uses positive and negative links.

It is sometimes interesting to create "fuzziness" in the behavior of the aggregation engine. This is obtained with mapping functions like the ones in FIGS. 16a and 16b.

Mapping Inputs from a Hierarchical Systems

When the features or properties characterizing the real world are computed using a hierarchical extraction system, two problems arise. First the original input is broken down in several representations and the dimensionality of the feature space may be too high to be represented effectively in the graph and to be then processed with the aggregation engine. The other problem is that with such extraction system, features or properties extracted in the later stages of the hierarchy are more meaningful and have a larger input domain than those on the lower level. This means that they may be handled differently when producing the mapping from the real world to the new representation.

Reducing Dimensions

Figure 17:
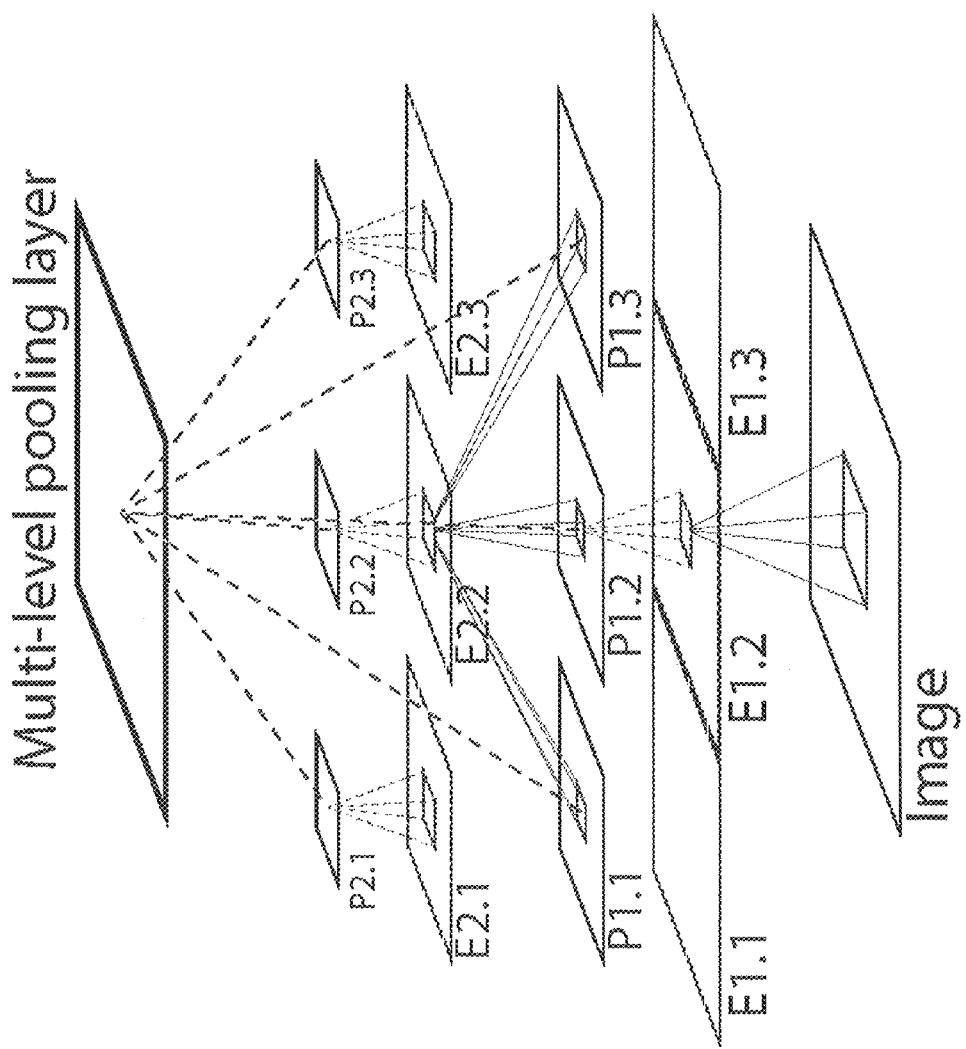
FIG. 17 is an example of a hierarchical feature extraction system for images.

To address the problem of high dimensionality, a pooling operation is created over the different representations in the feature space. This has not conventionally been done until now. FIG. 17 is an example of a hierarchical feature extraction system for images. FIG. 17 illustrates the concept with a two level hierarchical system extracting features from an image. The first layers of the hierarchical system are based on conventional convolutional networks and are well known in the art. But the highest layer, in multi-layer pooling, proceeds very differently when compared to those conventional networks. It achieves a multi-level pooling operation across all levels of the hierarchy. This multi-level pooling layer has the same size than the input. For each location on the input, only the most important feature across all level is retained. Only those retained features will be used to from the graph in the system.

In FIG. 17, each level of the hierarchy is composed of extraction layers, denoted $E(z \cdot q)$ and pooling layers, denoted $P(z \cdot q)$. z is the level in the hierarchy and q is the index of the feature extractor on the level. An extraction layer computes the feature's response at a point i on its inputs. The input image is represented as a vector, the (x,y) position is indexed as i=y*ImageWidth+x. The pooling layers accomplish a max-pooling operation over a local spatial region on their extraction layer. The final multi-layer pooling layer realizes a max-pooling operation over the complete feature space on all levels of the hierarchy. In a case where a physical entity is characterized with a multi-dimensional system such as the hierarchical feature extraction system, each element on a physical entity is represented by multiple features. The multi-level pooling layer of FIG. 17 may then select the strongest feature, for each element of the physical entity. As such, only the strongest features will be present on the final pooling multi-layer, and used as input for the formation of the graph.

The final pooling layer, represented as the top layer in FIG. 17, is the operation that allows us to reduce the dimensionality of the input data. The pooling is accomplished over each of the hierarchical pooling layers, with Q being the number of feature extractors per layer, and Z the number of layers. $R_i$ is the value on the response layer at position i, and it represents the response of the strongest feature at that location.

$$R_i = \max[t(z \cdot q)_i] \quad (5)$$

for $1 < z < Z$ and for $1 < q < Q$, in which t is defined as:

$$t(z \cdot q)_i = \begin{cases} K_z P(z \cdot q)_i & \text{if } P(z \cdot q)_i \geq T_z \\ 0 & \text{otherwise} \end{cases} \quad (6)$$

The intent is to group on a single layer the multiple dimensions obtained with convolutional networks by keeping the most prominent feature at any given location on the image.

The features however pass through a thresholding operation described by equation 6. $T_z$ is a threshold for the level z of the hierarchy. Higher levels have a higher threshold to avoid having too many of them in relation to the lower level features. The reason for this is the higher in the hierarchy a feature is located, the more representative of an object it becomes, and it is desired to select them when they react strongly. All features that do not cross their respective level threshold $T_z$ are not considered in the pooling operation. $K_z$ is a multiplicative constant that depends on the level z of $P(z \cdot q)_i$. The higher the level, the bigger the value of $K_z$ becomes. Reasons for this are detailed in the following subsection.

Mapping Feature Priorities

The extraction layers are computing the projection $E(z \cdot q)_i$ between input patches and the feature extractors (sometimes called the basis vectors). That means the stronger the response, closer the input patch is to the feature. Strong responses are then prioritized in the mapping. To do so, $E(z \cdot q)_i$ is normalized by its input $I(z)_i$ and by the feature basis $B(z \cdot q)$ so that the result is between 0 and 1. The normalization is expressed in equation 7. $I(z)_i$ is a vector representing the input to the feature extractor at location i. It comes from the level below the extractor, so for level 1, $I(1)_i$ would be a patch on the input image centered at location i. $B(z \cdot q)$ is the feature (basis) vector constituting the feature extractor at level z for feature q.

$$E(z \cdot q)_i = \frac{I(z)_i * B(z \cdot q)}{\sqrt{\Sigma I(z)_i^2} \sqrt{\Sigma B(z \cdot q)^2}} \quad (7)$$

By normalizing with both the input and the basis vector, the strongest feature in the input has the strongest response on its level, which is consistent with the pooling described in the previous section. Once the final response values $R_i$ are obtained, all values are normalized, thus the strongest feature has the strongest response. To include this information in the mapping, the strength of the links between the active units is modulated as expressed in the following equation. This is done by multiplying the amplitude of the feature responses with the original link strength. Note that $h(f(i)-f(j))$ represents the conventional mapping between two features and could be expressed for example by equation 4.

$$I_{ij} = h(f(i) - f(j)) R_i \quad (8)$$

Also, to take into account the level of the features in the hierarchy, the response strength is multiplied by the constant $K_z$ depending on the level in the hierarchy, as expressed in equation 6. The higher the level, the bigger the feature response becomes. This may change depending on the application. In an embodiment, a factor of 10 is added for each level in the hierarchy. This results in the mapping of stronger links between units representing predominant features for use with the aggregation engine. Those predominant features then have more influence and tend to aggregate their connected units much more easily.

Initialization of Graphs

A graph with random initialization of labels and states may take a while to rest (if it does) before any structure like patterns appears. Therefore, in an embodiment a suitable initialization method is presented. Different techniques are described in this section.

Initialization Using Hierarchical Inputs

With inputs coming from a hierarchical extraction system, a dedicated initialization method may be used because the features are directly informing us of the pertinent content of the entity. Higher level features are representing the most pertinent information in the input. To use that information in the engine, the concept of active and passive discrete processing units is presented. High level units are active, and all the other units are passive. Active units are those that may generate events on their own (source events as described in section Discrete aggregation engine process). Passive units are simply units that do not generate events on their own. By initializing the engine this way, the pertinent units are the ones driving the activity. Regions on the graph with non pertinent input data may remain passive, thus saving computation time.

The initial state $s_i$ of the units is determined by the strength $R_i$ of its feature.

$$s_i = R_i \quad (9)$$

As expressed in equation 6, with the constant $K_i$, the higher the feature is in the hierarchy, the stronger its response $R_i$ becomes. This has the effect of boosting the response of high level features which then become more active and trigger their events first in the case of discrete processing units. This guides the engine to process predominant parts of the graph first. For a fast application not needing all the details in the entity, an embodiment may realize a limited number of aggregation iterations and may already have processed the most pertinent (according to the extracted features) parts of the graph.

State and Label Initialization Based on Link Strength Distributions of Continuous Processing Units An initialization module of the system is described here. This module iterates through the population of processing units. During each iteration, the module updates the state of each processing unit and then normalizes the states by dividing by the state value of the processing unit having the highest state value. After normalization, the module switches off the processing units whose state variable is smaller than a determined threshold. This process gives birth to a kind of wave propagation through the graph that connects the processing units. The last processing units to die are those that are strongly linked. This small module reveals the distribution of links through the graph based on the density strength of the links. The first processing units to die (switch off) are those that are weakly linked, whereas those which die last are strongly connected.

Links $I_{ij}$ have been created with the mapping. For example, the entity is characterized by features such as color, position, orientation, etc. in images. After each iteration, the output of the module is a set of processing units that just died. Processing units that die at the end of the same iteration have comparable state values.

Process Description

The state of a processing unit is initialized as the sum of its initial links $I_{ij}$. The units then iteratively propagate their state to other units through these links. During an iteration, the state of each unit changes as a weighted sum of states as shown in equation 10.

$$state_i \leftarrow state_i + \sum_j state_j \times l_{ij}(s_i, f_i; s_j, f_j) \quad (10)$$

where the sum is taken over all units j to which unit i is connected. $I_{ij}(s_i, f_i; s_j, f_j)$ may be updated depending on the similarity between $s_i$ and $s_j$.

Based on previous equations, state values of all units increase at each iteration (with a configuration where positive links are more dominant than negative links). The state of the units, which have few links or which are connected to units with features or properties different from theirs, increase slowly. Units with multiple links to units with similar features see their state variable increase very quickly. That is, units within homogeneous patterns are clearly distinguished from the ones within non-homogenous patterns. This is because the variation of state values $s_i$ is much greater for homogeneous patterns.

The set of state variables are normalized after every iteration. A hard threshold is applied to zero the state variable of the units with lower state values. The first units to be thresholded are the ones within the less homogeneous patterns, while units which retain a non-zero state variable after several iterations may be considered to be in the center of very homogeneous patterns.

Example of Application to Clustering

When the mapping encodes distances between two points in links $l_{ij}$, the system may be used to cluster density of points. It is a way to represent sets of points distributed in an N dimensional space into a smaller space of dimension M. M is defined by the distribution of connectivities between the continuous processing units. If processing units are distributed on a plane, then M=2, if the processing units are distributed in a cube, then, M=3, etc. FIG. 18 illustrates the application of the system for clustering 3 dimensional points based on a one-dimensional distribution of processing units. In this example processing units are fully connected.

FIG. 18 shows an application of the system to clustering with a set of inputs i characterized by features or properties f. These features (or properties) are encoded into links $l_{ij}$ between the processing units u. The closer two inputs are in the feature (or property) space, the stronger the link between the corresponding units. Input 1 is close to inputs 2 and 3 and therefore has strong links with them. Inputs 2 and 3 are somewhat close together and have moderate strength link between them. Input 4 is far from the others and has a weak link to inputs 1 and 2. Unit 1 has 2 strong links to other units and its initial state is high (the box u1 is light). Unit 4 has few links and its initial state variable is low (the box u4 is dark). At each iteration, units 1, 2 and 3 propagate their state among themselves through the strong links between them. Their state variable increases quickly. Unit 4 is lightly influenced by units 1 and 2 and its state remains low. The difference between states of units 1, 2 and 3 and that of unit 4 is that states of units 1, 2 and 3 consistently increase and the latter eventually becomes thresholded and switched off. The process thus accomplishes a form of clustering, recognizing that units 1, 2 and 3 are part of a different cluster than unit 4. With an increased number of iterations, the difference between the state of unit 1 and that of units 2 and 3 becomes apparent. Eventually, unit 1 maintains a non-zero state, as it is the unit with the strongest links with other units.

Illustration for Image Processing

The system may be used for image processing. Again, the mapping defines the relationship between the real world and the graph that is manipulated by the aggregation engine. In the following application, the system is used to identify highly textured regions of an image. Features are gray levels of pixels and processing units are locally linked to their 8 neighbors. This 8-neighbor connectivity may be obtained by computing the links based on both the pixel values $p_1$ and the location $L_2$ of the pixels such that $$l_{ij} = h_1(p_1(i) - p_1(j)) \times h_2(L_2(f) - L_2(f)) \quad (11)$$

where $h_1(\ )$ encodes the value of the links based on the processing unit's features and $h_2(\ )$ would be defined by equation 12.

$$h_2(L_2(i) - L_2(j)) = \begin{cases} 1 & \text{if } |L_2(i) - L_2(j)| \leq 1 \\ 0 & \text{otherwise} \end{cases} \quad (12)$$

Figure 19:
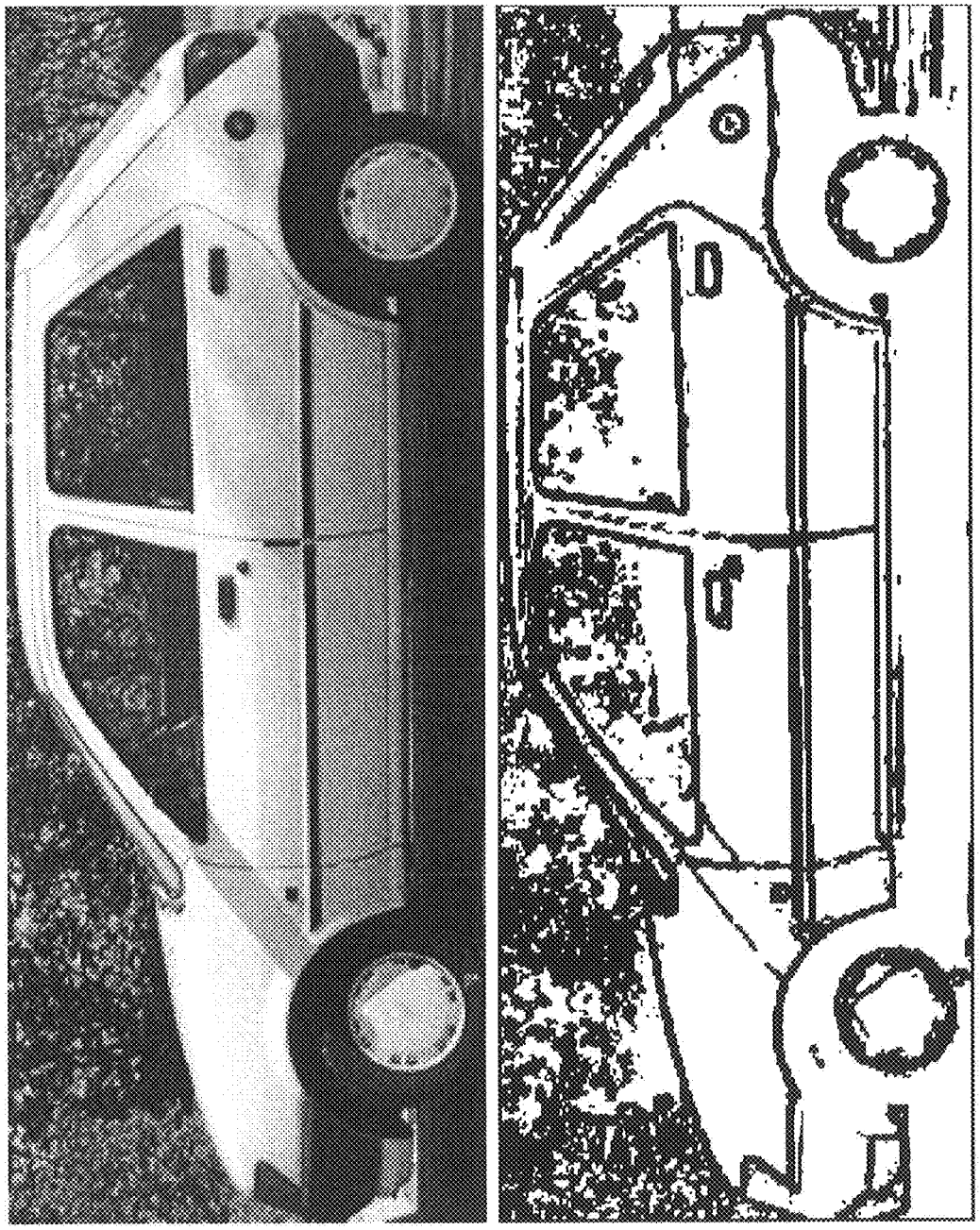
FIG. 19 illustrates a use of the system's initialization module for image processing.

With the use of these functions, contours in the images may be very clearly identified directly after initialization as shown in FIG. 19.

FIG. 19 illustrates a use of the system's initialization module for image processing. Top: an original 406×158 pixels image of a car. Bottom: state variable of the units after initialization. The segment contours are clearly visible as dark lines.

Figure 20:
FIG. 20 shows state variables of the processing units after processing iterations of the image of FIG. 19.

After a few iterations, continuous processing units in the textured parts of the image are thresholded and bigger homogeneous segments remain visible. FIG. 20 shows state variables of the processing units after 25 processing iterations of the image of FIG. 19. After this, each continuous processing unit may be qualified as being mapped to a textured or homogeneous part of the image entity. The graph may then be reconfigured using discrete processing units this time. The information collected during the previous phase may be used to determine which discrete processing units are to be active and which ones are to remain passive. Typically, processing units corresponding to textured patterns (segment) of an entity (image) are not used to produce activity in the graph, they remain passive.

FIG. 20 shows a result obtained after 25 iterations. Of course, this number of iterations is provided as a non-limiting example, and those of ordinary skill in the art, having the benefit of the present disclosure, will be able to determine other numbers of iterations most suitable to their particular situations. In FIG. 20, units in the most highly textured portions of the image have been thresholded and appear in black. The bright segments are the biggest, most homogeneous ones.

Aggregation Engine and Labels

To initiate the aggregation engine, each processing unit is first assigned a unique label. As an example, initial labels may correspond to a number representing the unit position in the graph. Labels may also be assigned randomly, as long as they are unique. During the iteration process, when a unit is trying to aggregate another one, the dominant unit imposes its label to the other one which is called the subordinate unit. All units with the same label are then considered as part of the same pattern. Which unit is the dominant one depends on the way the aggregation engine is implemented. The aggregation engine process for both the continuous and the discrete implementation is described hereinbelow.

Continuous Aggregation Engine Process

For the continuous implementation of the aggregation engine, each processing unit is independent. The whole set of processing units may thus be handled in parallel. In some embodiments, parallelism of the process may be realized using hardware implementation of discrete processing units. The new state of a unit depends on the state of the other units at the previous iteration. When a unit is processed, it does not modify the state of any other unit. Instead, its new state is computed based on the states of the other ones. This new state may be computed in different ways. For instance, equation 10 (used for the initialization of the units) may also be used during the processing. The dominant units in this case would be the ones with the highest state variable and they may propagate their labels to units with lower state value.

Another way to update the state of the continuous processing units (cPUs) is by using a measure of the cohesion between the states of all connected cPUs. Equation 13 illustrates a way to do so.

$$s_i = \frac{\sum_j [(s_j - s_i) \times l_{ij}(s_i, f_i; s_j, f_j)]}{\sum_j l_{ij}(s_i, f_i; s_j, f_j)}, \qquad (13)$$

The sum is taken over the set J of all units $cPU_j$ connected to unit $cPU_i$ and $I_{ij}$ is the strength of the link between units i and j. A circular state space may be used if units with extreme state values are expected to be aggregated together.

Labels are then determined using a rule based on the local values the units may acquire from their neighbors. Such a rule may be anything that allows the processing unit to decide which label to choose. For instance, the processing unit $cPU_i$ may take the label of processing unit $cPU_j$ if their state if similar and if $cPU_j$ is the unit with which $cPU_i$ has the strongest link.

The following description details the aggregation procedure, a serial implementation where the processing units are handled in sequence. However, such a process is designed to be very efficient in a massively parallel hardware environment. Processing all units simultaneously may yield much faster performances without changing the end result.

1. Start a new iteration
2. Select a processing unit $cPU_i$ which hasn't yet been processed for the current iteration.
3. Compute the new state according to the state update equation (such as equation 10 and/or 13)
4. Go back to step 2) until all processing units have been handled for the current iteration.
5. Update the state of all processing units.
6. Update the label of the units if one of their neighbors is a dominant one
7. Go back to step 1) until enough iterations are made.

Discrete Aggregation Engine Process

For discrete units, labels are propagated when an event occurs. That is, if a discrete processing unit $dPU_i$ triggers an event, it becomes the dominant unit and tries to propagate its label to the units it is connected to. Label propagation occurs on a connected unit $dPU_j$, if the output contribution from $dPU_i$ is strong enough to trigger an event on $dPU_j$. Fulfillment of additional aggregation conditions allows label propagations. These conditions are discussed later in this section. Also, source events and ripple events may be generated by discrete processing units. Both kinds of events have the same consequences in the engine; the difference resides in the way they are generated, as it is described in the following subsection. Source events are produced in the graph from mostly external inputs and are emitted from few localized processing units. Ripple events are emitted by a collection of processing units and propagate through the graph (like waves). Embodiments of the system may be realized without the use of a network of spiking (or firing) neurons. In fact, each processing unit propagates an event and a label. For some applications the system may use spiking neurons as discrete processing units. Then, labels are not used but, the behavior of the system is still under the control of the aggregation engine.

Here is an overview of the discrete aggregation engine:
1. The discrete aggregation engine is a device that runs on graphs (or sections of graphs) that comprise discrete processing units (dPU).
2. dPUs are composed of:
   (a) A label
   (b) A state variable
   (c) A state threshold value
2. dPUs may generate events:
   (a) dPUs generate an event when the state value crosses its state threshold
   (b) Source events may be generated if no dPU has a state exceeding its threshold
   (c) Source events may be generated through time integration
4. Labels are propagated when events occur
5. Fulfillment of aggregation conditions allow a dominant unit to propagate its label to a subordinate unit
6. dPUs within a same pattern may coordinate their behavior:
   (a) dPUs may coordinate their events
   (b) dPUs may coordinate their aggregation status Event Generation Each discrete processing unit has an internal state threshold. The threshold may be dependent on the activity occurring in the graph, or it may be determined during the mapping operation. If $dPU_i$ generates an event and the contribution sent to $dPU_j$ through the link $I_{ij}$ is strong enough to make the state of $dPU_j$ cross its threshold, $dPU_j$ resets its state value and generate a new event. Events generated in this fashion are called ripple events, because they propagate like a wave if all the units are strongly connected. Source events act as starting points for ripple events. Source events may be generated using different approaches that may greatly affect the behavior of the aggregation engine. The following sections describe the implemented methods.

Highest State Selection

The simplest method for generating a source event is simply to manually trigger an event on the processing unit $dPU_i$ with the highest state value in the graph. Once the event is processed, the state of $dPU_i$ is reset, and another processing unit acquires the highest state value in the graph. A particularity of this method is that the state initialization values have a strong impact on the behavior of the system. To be triggered, processing units with low initial state values need to receive much more contributions than units initialized close to their state threshold.

Time Integration

A more elaborate method for generating source events is to introduce the concept of time integration. With this method, each processing unit modifies its state over time by integrating a given input, called the charging factor. This allows units with a low state value to climb toward the state threshold on their own, reducing the influence of initialization values, and thus, giving more importance to the links connecting the units. A source event is generated by a processing unit crossing its state threshold on its own through time integration. Different charging factors may generate different behaviors in the graph. The simplest charging factor that may be used is a constant input for every unit. This yields a pretty straightforward behavior wherein the units keep the same state distance between each other when no event occurs while time increases.

A more complex way to manage time integration is to use a charging factor that changes as a function of the state value.

$$ds/dt = I - s/\tau \qquad (14)$$

$\tau$ is a parameter which allows controlling the slope of the curve. I is the input (charging factor) integrated by the unit and is calculated using equation 15.

$$I = S_m/\tau \qquad (15)$$

$S_m$ is the maximum state value the unit is able to reach by integrating its input. By setting $S_m$ over the state threshold, an active unit is created, and by setting $S_m$ under the state threshold, a passive unit is created, which do not generate source events. As the state value is approaching $S_m$, the charging factor gets smaller, giving rise to state values varying exponentially in time.

Figure 21:
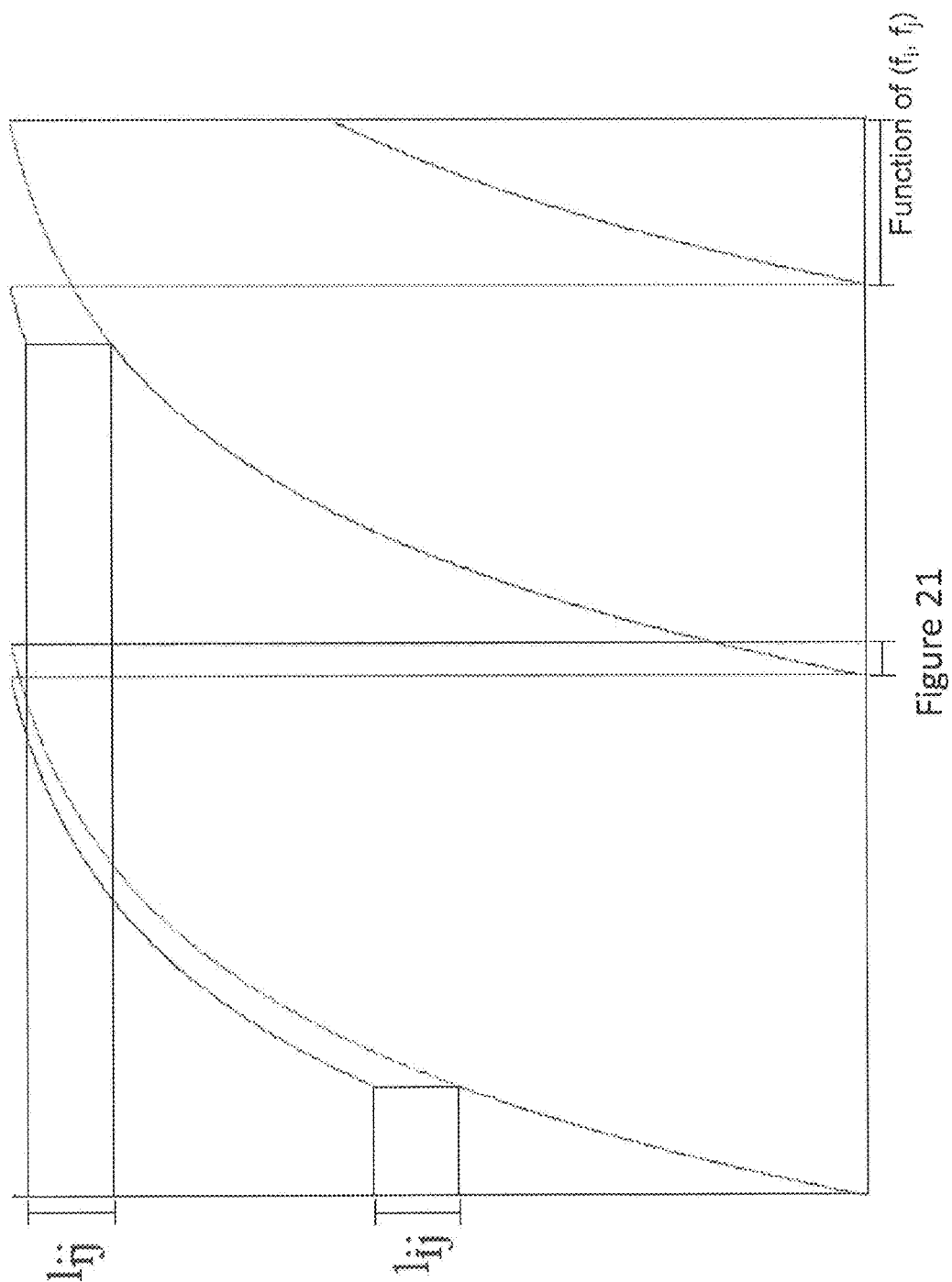
FIG. 21 shows the effect of event generation on the state variable of a discrete unit.

The time evolving state of a processing unit is illustrated on FIG. 21 for an active processing unit. As time goes, the processing unit moves to the right, reach the threshold and is reset after having emitted an event.

The time-evolution of its state value is shown in FIG. 21. Let us consider what happens when this discrete processing unit receives an event. In FIG. 21, the dPU receives two events which increase its state by the amount of the link strength $I_{ij}$. This increase in the state may be translated into a change in the event emission instant phase. Depending on the timing of the event, the same link has a different influence on the receiving dPU's phase. The closer the dPU is to the threshold when it receives an event, the bigger the increase of its phase.

FIG. 21 shows the effect of event generation on the state variable of a discrete unit. The Figure illustrates the phase/timing difference in function of the time at which a dPU unit receives an event.

Figure 22:
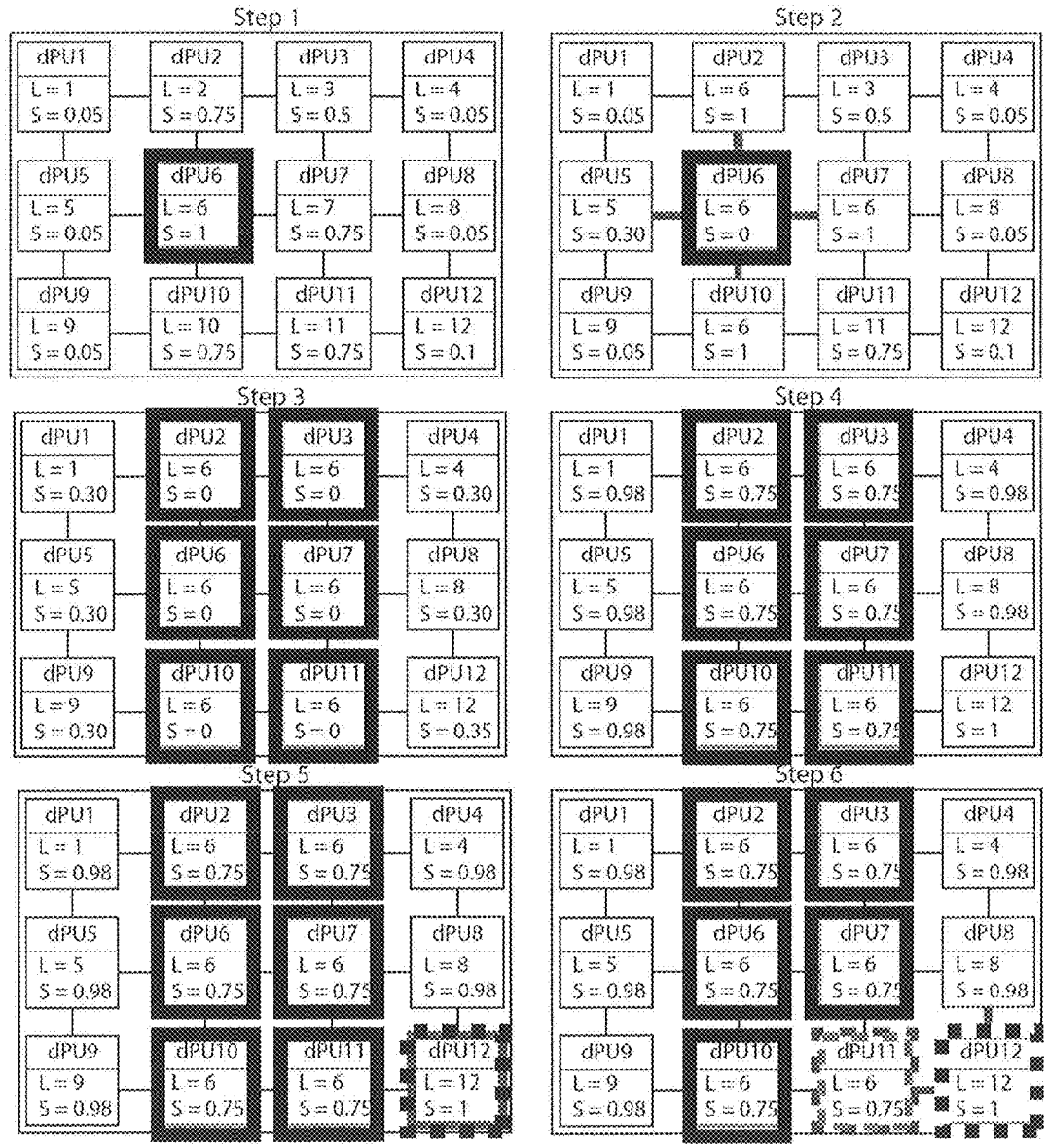
FIG. 22 is an illustration describing some operations in the aggregation engine, with discrete units.

If the charging factor is reduced as the state value becomes higher, this makes the units with lower state values increase their states faster. This favors units close to the state threshold to have a smaller state difference, thus favoring ripple events. This accelerates the aggregation process compared to source event generation methods mentioned hereinabove. However, this also has the inconvenience of allowing weakly connected units to trigger each other. FIG. 22 illustrates how such a situation may happen. From Steps 3 to 4, time is simulated and units with a higher state value increase their state variable at a slower rate than units with a lower initial state value. This has the effect of reducing the state difference between processing units and thus allowing $dPU_{11}$ to trigger $dPU_{12}$ in step 6, whereas this was not possible in step 3, before the time simulation.

Label Propagation

As mentioned earlier, labels are propagated when events occur. A unit generating an event is dominant and tries to propagate its label to connected units. For discrete units with time integration, when two units have the same state, they are synchronized in time. It may be observed that the synchronization has no direct influence on the aggregation process, while this is not the case with conventional networks of spiking neurons. With the system, even if two processing units have the same state and are synchronized, they are not necessarily aggregated. The label acts as the aggregation mechanism. Here is a procedure describing in details the general process.

1. Select a processing unit $dPU_i$ to generate a source event, using one of the methods described in the preceding section. This is illustrated in step 1 of FIG. 22 for an implementation using exponential state variation with time. The processing unit $dPU_6$ is selected as its state value exceeds the threshold.
2. Reset the state and send the output of $dPU_i$ to connected units, as in step 2 of FIG. 22.
    (a) Select a processing unit $dPU_j$ connected to $dPU_i$ but with a different label, and compute the new state of $dPU_j$ according to the output of $dPU_i$, which is computed using the strength of the link $I_{ij}$.
    (b) Change the label of $dPU_j$ for the label of $dPU_i$ if aggregation conditions are met.
    (c) Go back to step a) for all processing units connected to $dPU_i$.
3. Go back to step 2) until all processing elements exceeding their threshold have been handled. The resulting state of the network after this step is illustrated in step 3 of FIG. 22.
4. Go back to step 1) to continue simulation, as in step 4 of FIG. 22.

FIG. 22 is an illustration describing some operations in the aggregation engine, with discrete units. Each processing unit $dPU_i$ has a label L and a state variable S integrating an exponential charging factor through time. Internal state threshold is 1 for all units and for simplicity purpose, all link strengths are set to 0.25. Step 1 selects a unit crossing the threshold, $dPU_6$ being highlighted with thick lines. Step 2 resets the selected ($dPU_6$) unit state and sends its output to the connected units, as shown using thick lines, while propagating its label. Step 3 shows the graph state once all units crossing the state threshold have been processed. In step 3, thick lines show the units that are within the part identified by label 6. Step 4 shows the graph state after a time simulation making the unit with the highest state value ($dPU_{12}$) reach its threshold. Note that for the sake of explanation, the state values are not directly calculated using equation 14, but were rather approximated to accommodate the example. Step 5 shows the selection of the next unit reaching the threshold, $dPU_{12}$ being highlighted with thick dashed lines. Step 6 repeats Step 2; however, this time a conflict emerges with $dPU_{11}$ between labels 6 and 12.

Aggregation Conditions

Meeting some conditions when a unit tries to aggregate another one allow to avoid over-aggregation. Those conditions may be adjusted to best fit behavior needed for a given application.

Aggregation Condition 1

This first condition stipulates that the link between the dominant and the subordinate unit is stronger than a certain threshold. This is to ensure that labels are propagated between units with a sufficiently strong link. Without this condition, there are cases where $dPU_i$ may trigger $dPU_j$ even if they are weakly connected. This may happen if the state difference between the two units is small enough due to initialization values or simply because of the engine behavior. For example, if source events are generated without time integration, once a unit generates an event, its state is reset, and does not increase until it receives external contributions. This leads to a graph with many low state values, and thus, many units with similar states. Another example of such a situation is illustrated in steps 3 to 6 of FIG. 22 and described in more details in the section discussing source event generation using time integration with exponential state dependent charging factor, as expressed in hereinabove in the "Time Integration" section.

Aggregation Condition 2

A subordinate unit may be set to wait for multiple aggregation attempts within the same iteration. When a dominant unit with a label L tries to aggregate a subordinate unit $dPU_j$, it counts as an aggregation attempt by pattern L on $dPU_j$. An array of counters that keeps track of the number of attempts per pattern on $dPU_j$ is used. If two different patterns try to aggregate $dPU_j$, two separate counters are obtained, keeping track of the number of attempts for each pattern. As a pattern is a set that comprises all processing units (PU) that have the same label, a counter counts the number of attempts made by dPUs having the same label. If the number of attempts per pattern is set to 2, a subordinate unit needs to be aggregated by two dominant units of the same pattern within the same iteration, as a condition to have its label changed. This is to avoid "leaks" to occur between patterns. If two patterns are connected by a single link, this condition prevents the two patterns from merging. A simplified version of the aggregation condition may be implemented by counting the total number of attempts on a specific $dPU_j$ without taking into account the pattern's identity. This will avoid aggregation on a dPUj with to few connections. Errors occurring when multiple patterns try to aggregate a unit within a same iteration are expected to be relatively rare for most application.

Aggregation Condition 3

When dominant and subordinate units are part of different patterns, the statistics of the patterns may be used to determine whether or not aggregation is appropriate. This is highly application dependent, but as example, if features are image pixels, the difference between the average color of the two patterns could be an example of an aggregation condition.

Coordinating Pattern Units

Once the labels are propagated, units with the same label are considered as being in the same pattern and their behavior may be coordinated to produce more unified patterns. Two methods are presented for coordinating patterns. Depending on applications, either none, one or both of these methods may be used in the aggregation engine.

Figure 23:
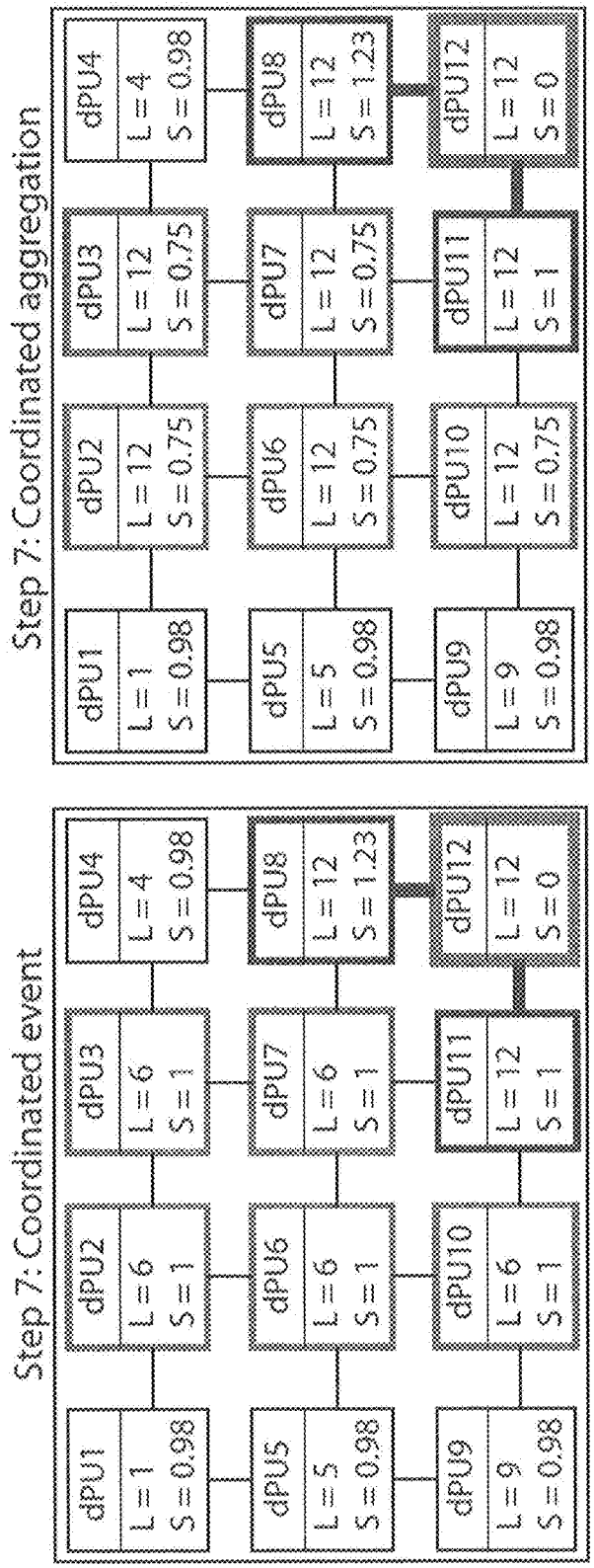
FIG. 23 is a description of step 7, following step 6 of FIG. 22, where $dPU_{12}$ triggers $dPU_{11}$.

FIG. 23 is a description of step 7, following step 6 of FIG. 22, where $dPU_{12}$ triggers $dPU_{11}$. On the left, the illustration shows step 7 when using coordinated pattern events as described in the text. On the right, the illustration shows step 7 when using coordinated pattern aggregation as described in the following text.

Coordinating Pattern Events

Figure 24:
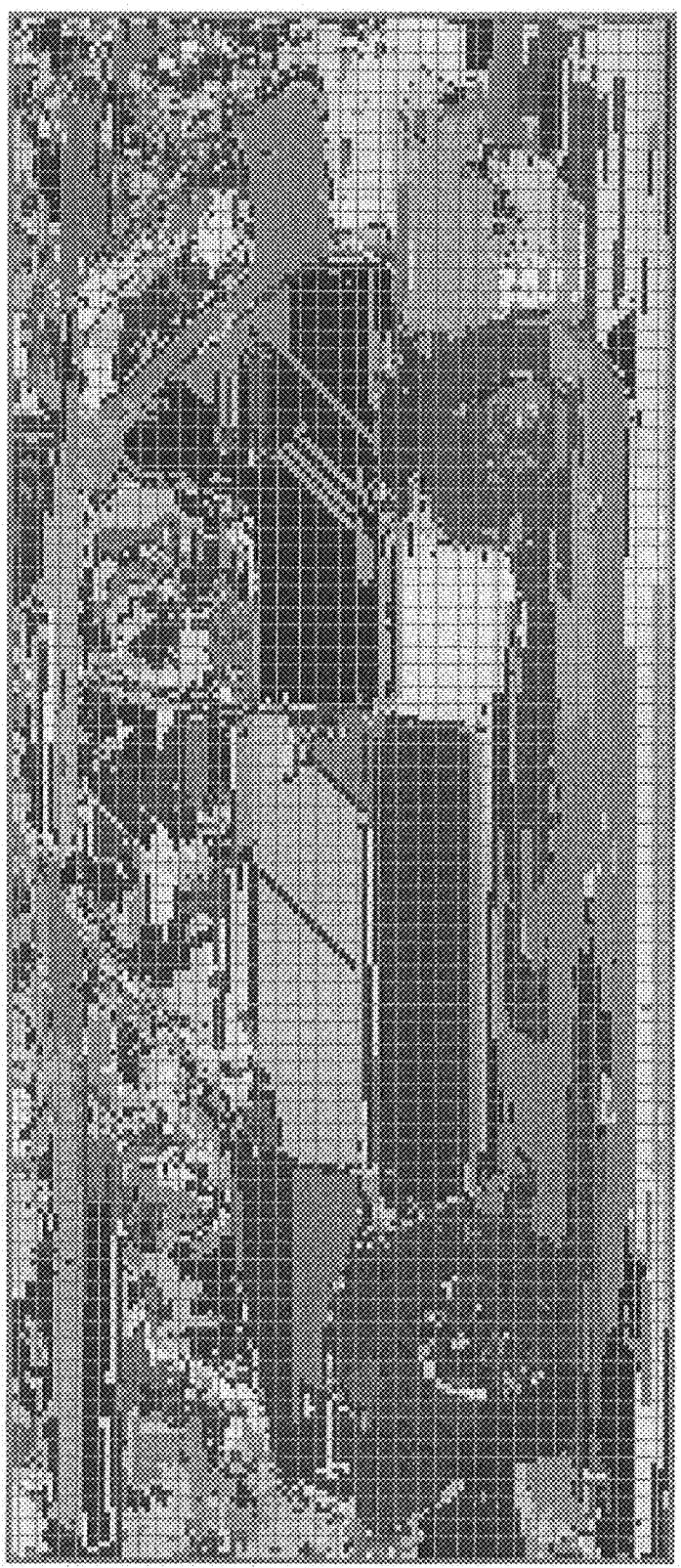
FIG. 24 shows an image segmented without coordinated pattern events.
Figure 25:
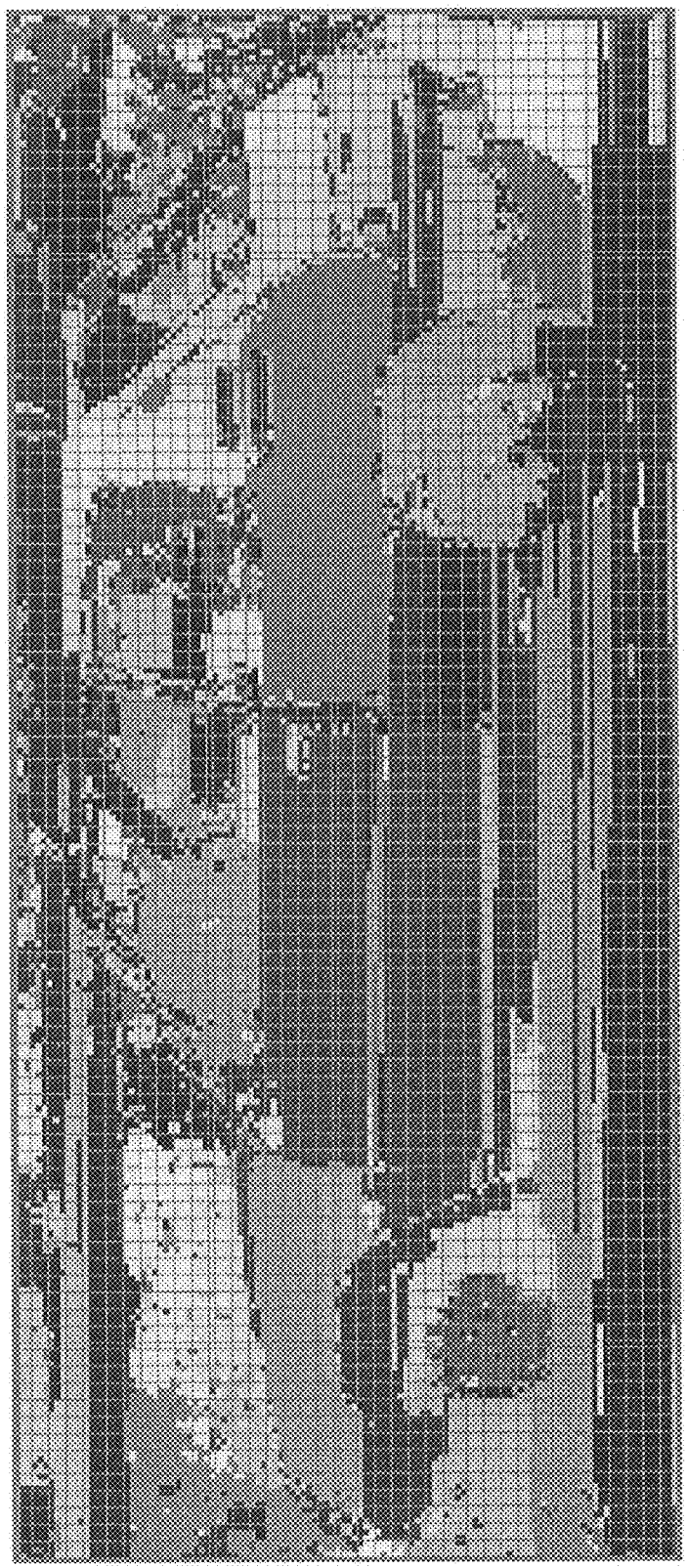
FIG. 25 shows the image of FIG. 24 with coordinated pattern events.

One way of coordinating patterns is to coordinate their events together, meaning that when a unit generates an event, all units with the same label automatically generate their events. For example, in step 6 of FIG. 22, if $dPU_{12}$ triggers $dPU_{11}$, all units with label 6 would automatically be triggered. This is illustrated on the left part of FIG. 23, where all units with label 6 have their state value raised to the threshold. This has the effect of maintaining the structure integrity of already formed patterns, which may be good for some applications like image segmentation, or telecommunication network routing. FIG. 24 shows an image segmented without coordinated pattern events, while FIG. 25 shows the image of FIG. 24 with coordinated pattern events. As may be seen by comparing the two results, individual units within a pattern may be "stolen" by other parts if the events are not coordinated. This results in an over-segmentation of the image, as it is clearly the case on the upper part of the car's front door in FIG. 24.

Coordinating Pattern Aggregation

Figure 26:
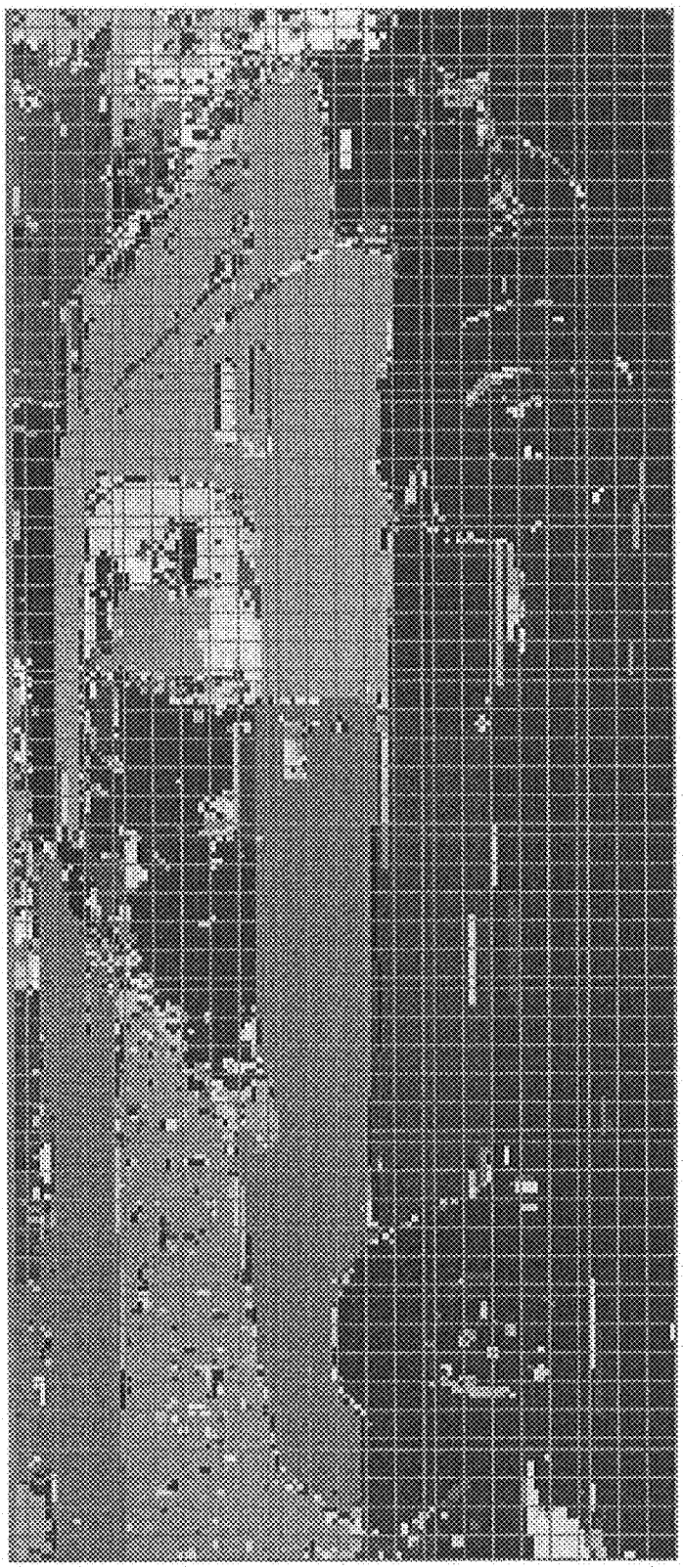
FIG. 26 shows the same image of FIG. 24, but this time segmented using coordinated pattern aggregation.

Another way of coordinating patterns is to coordinate the aggregation of the units, meaning that when a unit's label is changed by a dominant unit of another pattern, the label of all units is changed within the subordinate unit's pattern. This is illustrated on the right part of FIG. 23, where all units with label 6 on step 6 of FIG. 22 now have the label 12 after $dPU_{12}$ triggered $dPU_{11}$. This effectively allows for patterns to merge very quickly. FIG. 26 shows the same image of FIG. 24, but this time segmented using coordinated pattern aggregation. Comparing FIGS. 25 and 26, it may be seen that patterns like the bottom part of the car's forward doors are now merged with this method while they were not when coordinating pattern events. However, merging patterns may also bring some loss of information. For example, in FIG. 26, an under-segmentation phenomenon may be observed in the lower part of the image where the ground has merged with the wheels.

FIGS. 24-26 show results of aggregation with discrete processing units on an image. Pixel grey level values were used as features in the system. In FIG. 24, this was obtained without coordinating pattern behavior as explained in section Coordinating pattern units. The result was obtained after 500 iterations. In FIG. 25, this was obtained with coordinated pattern events as explained in section Coordinating pattern units. In FIG. 26, this was obtained with coordinated pattern aggregation as explained in section Coordinating pattern units.

Matching Using Predefined Reference

Figure 27:
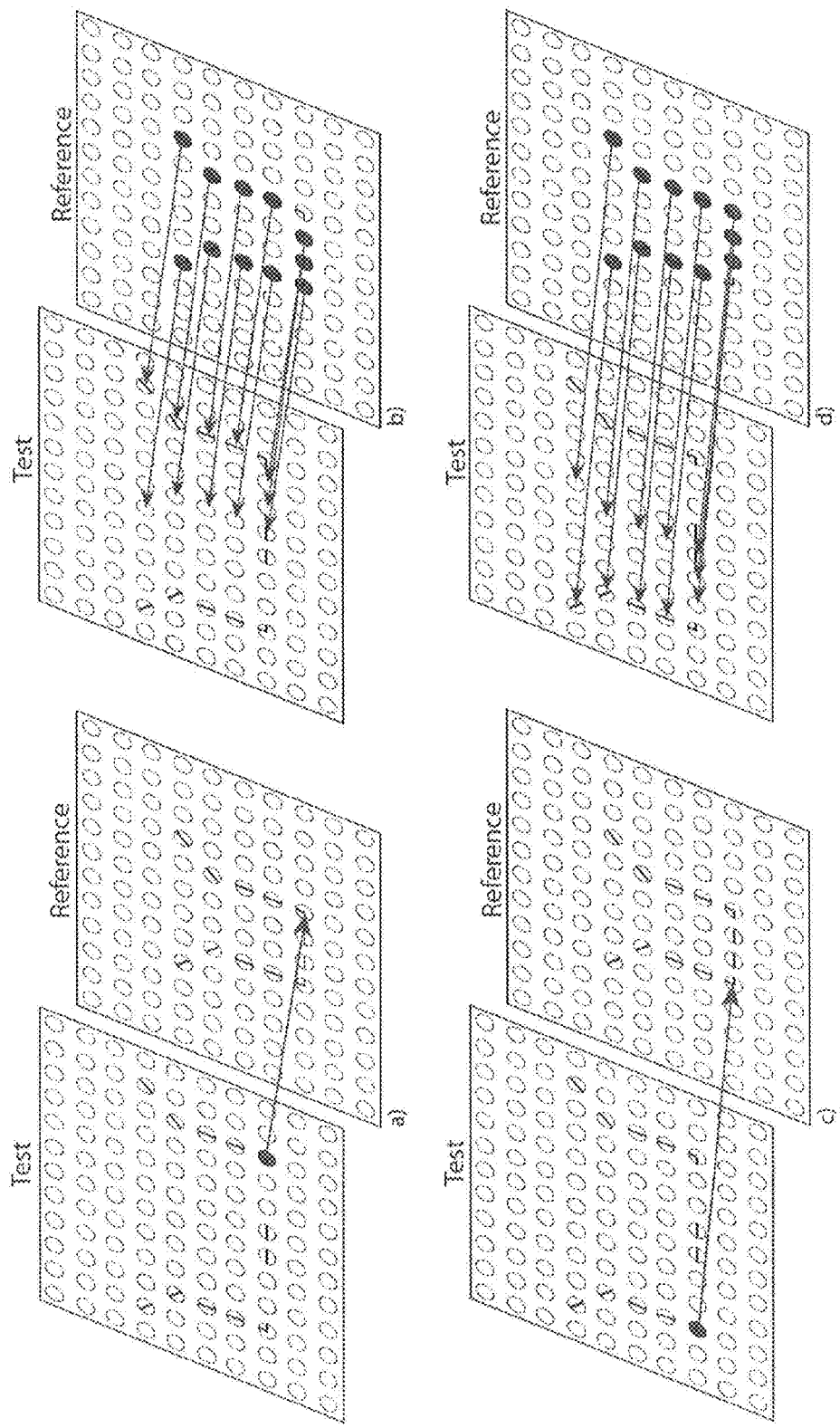
FIG. 27 is an example of reference matching applied to image recognition.

Graphs may be merged into a single graph and structures and patterns may also be revealed through this new graph. This time, the aggregation engine tries to aggregate patterns that were previously associated to different graphs. The present disclosure describes a method that associates new labels while preserving some of the structures that were revealed when the sub-graphs were disconnected. In some applications, the method finds whether sub-graphs are similar and characterizes the same entity in the real-world. If a sub-graph is a priori known, it is called a reference sub-graph and may be used to label other sub-graphs or patterns. A reference sub-graph may also be obtained when processing units associated with a first structure of the physical entity have been put to use to provide a graphical representation of that first structure. When at least two graphs are interconnected, each of the two graphs being associated with respective sets of processing units, the aggregation engine tries to aggregate patterns through the graphs. For example, a known pattern (a reference) may be searched within the physical entity to identify a second structure. FIG. 27, part a), illustrates this concept with an application of image recognition. The reference graph contains a pattern of a first structure that has already been processed by the aggregation engine and the test graph contains the second structure of the physical entity in which it is desired to find the reference pattern (in this case an image). Both graphs are merged into a single graph. The links between units in the test sub-graph entity are computed as described hereinabove. However, a modulating factor $K_S$ is introduced to reduce the strength of the links between the processing units. With weaker links on the test graph, the aggregation process slows down and is more easily influenced by the links coming from the reference sub-graph, which are stronger in comparison. Since the pattern is already aggregated on the reference graph, this forces the reference pattern to emerge on the test sub-graph. Higher link strengths between processing units associated with the first structure and processing units associated with the second structure trigger an aggregation of the first and second structures. The complete process is detailed later in this section. The magnitude of the reduction may depend on applications. In an embodiment, for object recognition using hierarchical features, a factor of $K_s=10$ may be used.

To start the process, anchor points are searched between the test and the reference graphs. Assuming that the reference pattern is present in the test entity, anchor points are corresponding points between the two patterns. As an example, in FIG. 27, part a), the lower right corner of the pattern is used as anchor points between the two patterns. Of course, finding true corresponding points between the two graphs is not an easy task, but the model is flexible and may still function if used anchor points are in fact not corresponding points between the two patterns. These false anchor points most likely have a negligible effect on the test graph aggregation process; the reason for this is discussed later in this section. Finding anchor points is application dependent.

For system using hierarchical features, anchors points can be found using high level features. Matching pairs of high level features between the two graphs are given a score, based on link strengths between processing units associated to features of the two graphs. The score determines if they are good anchor points. The score is computed by summing over a Gaussian window, the connections weights between neurons of each sub-graph around their corresponding high level neurons of the matching pair. Given a Gaussian window g(x,y) of size s, centered on each sub-graph on the neurons of the matching pair M(Mt, Mr), where x and y are the horizontal and vertical position from the center, the score can be computed by equation 16.

$$\sum_{x=-s, y=-s}^{s} w(Mt_{(x,y)}, Mr_{(x,y)})g(x, y) \qquad (16)$$

$w(Mt_{(x,y)}, Mr_{(x,y)})$ is the link strength, or connection weight, between neurons $Mt_{(x,y)}$ on the test graph and $Mr_{(x,y)}$ on the reference graph, each of them being located at a position (x,y) from the neuron of the matching pair (Mt, Mr) on their respective graph.

Localization of a pattern on the test graph can be done by using the matching pair with the highest score. This matching pair is considered for selecting the main anchor point. Additional anchor points can then be added by considering other high scoring matching pairs. A spatial localization criterion can be added to exclude matching pairs that are not adequately positioned on the input in relation to the main anchor. Given the main anchor A(At,Ar) and a matching pair M(Mt, Mr), we can computed the distance D between the positions of M on the test and reference sub-graph, in relation to the main anchor A, as detailed in equation 17. Matching pair with a too great distance D are not considered as anchor candidates.

$$D = \sqrt{((Mr_x - Ar_x) - (Mi_x - Ai_x))^2 + ((Mr_y - Ar_y) - (Mi_y - Ai_y))^2} \qquad (17)$$

Anchor points are very strongly connected between the two sub-graphs, such that the respective processing units coordinate their events. In other words, if an anchor point generates an event, the anchor point on the other graph is automatically triggered. FIG. 27 illustrates an example of reference matching in an application of image recognition with orientation features extracted in a hierarchical fashion. In FIG. 27, parts a) and c), an anchor unit on the test graph triggers its anchor on the reference graph. A series of unidirectional links going from the reference graph to the test graph are then defined. Each unit member of the reference's anchor point pattern becomes linked to the unit in the same relative position to the anchor point on the test graph. For example, in FIG. 27, part b), the unit directly above the anchor point in the reference graph, is connected to the unit directly above the anchor point in the test graph. Equation 18 describes the link between a unit r on the reference sub-graph, and a unit i on the test sub-graph. Their respective features strengths Rr and Ri are used in the equation to favor units representing strong hierarchical features. h(f(r)−f(i)) represents the conventional mapping between features and could be expressed by equation 4. Values Δx and Δy are the difference between r and i relative positions to their respective anchor point. The term g(Δx, Δy) represents a Gaussian window increasing the space where the reference unit has an effect on the test sub-graph, and thus giving a small invariance to size and translation. The form of the Gaussian window may be adjusted using σ$_r$. This is illustrated in FIG. 27, parts b) and d), however, to simplify FIG. 27, only the center link of the Gaussian window is illustrated.

$$l_{ri} = K_s R_r^2 R_i^2 h(f(r)-f(i))g(\Delta x, \Delta y) \qquad (18)$$

$$g(\Delta x, \Delta y) = e^{-(\Delta x^2/\Delta x_o^2 + \Delta y^2/\Delta o^2)} \qquad (19)$$

This way, a unit on the right part of the reference pattern does not affect the left part of the pattern on the test sub-graph. This kind of connectivity allows the reference to guide the pattern formation on the test sub-graph. Thus, if the reference object is present on the test entity, its structure may be revealed much more easily. On the other hand, if the reference pattern is in fact not present on the test entity, then anchor points may still be found between the two graphs, but since the same pattern is not present on the test graph, the reference graph may not be able to force it to emerge. This is shown in FIG. 27, parts b) and d), where one half of the reference pattern is present on the test graph at the location where it is supposed to be. Thus for half the pattern, the anchor point is not valid, however, as mentioned earlier, this has a negligible effect. Processing units trying to be aggregated by the reference layer that are in fact not part of the pattern on the test graph (left half of the pattern in FIG. 27, part b)), are most likely to represent features or properties not placed in an organized fashion, or at least, not in the same way as in the reference. Thus, they are weakly connected to the corresponding units on the reference graph and they won't be aggregated. This results in the correct pattern being triggered on the test graph. The different shape between the test and the reference pattern may be handled by the engine if enough anchors were initially found. This is shown in FIG. 27, where the second part of the pattern is triggered on the test graph by the second anchor point in c) and d).

The following procedure describes in details the process.

FIG. 27 is an example of reference matching applied to image recognition. Features are orientation extracted in a hierarchical fashion. High level features represent combination of simple orientations, effectively forming corners. The left layer is the test sub-graph with non-aggregated processing units and the right layer is the reference sub-graph with a single aggregated pattern. Each circle is a processing unit representing an orientation but for clarity purposes, only the features which are part of the entities' pattern are shown. In a), an anchor point on the test graph generates an event and triggers its corresponding anchor point on the reference. In b), all units which are part of the reference's anchor point pattern are triggered and they send their outputs on the test graph. Each arrow is actually representing multiple Gaussian weighted links as expressed in equation 16. In c), another anchor point generated an event on the test graph and triggers its corresponding anchor point on the reference graph. In d), all units which are part of the reference's anchor point pattern are triggered and they send their outputs on the test graph, effectively reaching the left part of the test pattern.

1. Find anchor points between the two graphs.
2. An anchor point generates an event on the test graph, as in FIG. 27, part a).
3. The corresponding anchor point on the reference graph generates an event and triggers the processing units within its pattern as in FIG. 27, part b).
4. Triggered units on the reference graph generate their events and send their output through their links on the test graph.
5. If units on the test graph have been triggered, process the event chain as usual 6. Continue simulation until another anchor point is triggered on the test graph and go back to step 1, which is illustrated in FIG. 27, part c).

Implementation of a Charging Curve for Discrete PU and Sorting Process with Organized Heap Queue This section is oriented to an implementation of the aggregation engine that uses discrete processing units, in which events are spikes or pulses. The organized heap queue provides an efficient sorting mechanism, especially, but not exclusively, in hardware implementations. In the context of the present disclosure, the aggregation engine may be at least partially realized as a neural network. The organized heap queue may further be used to find and sort the processing units that should be first processed by the aggregation engine. It may be used within a graph when this graph comprises spiking neurons.

The following implementation example is illustrated with a Leaky Integrate and Fire model of neurons, this example being made for purposes of illustration without limiting the present disclosure.

Implementation of a Piece-Wise Linear Charging Curve

The state variable of the processing units increases until it reaches a threshold. The increase of their value is non-linear, typically following a concave down exponential function. The exponential may be approximated using a piece-wise linear function. The number of segments is chosen to obtain a good compromise between complexity and accuracy. If the approximation is too poor, the processing units may not aggregate or may take longer to do so. In a time-driven implementation, a segment in the approximation corresponds to a value added to the state variable at each time step. Each segment has a different slope, corresponding to a different value to be added. To get the concave down shape, this value to be added for each segment is lower than that of the previous segment. A good compromise between complexity and accuracy also depends on the values to be added, and on the turning points, which are values of the state variable at which the slope changes.

Figure 28:
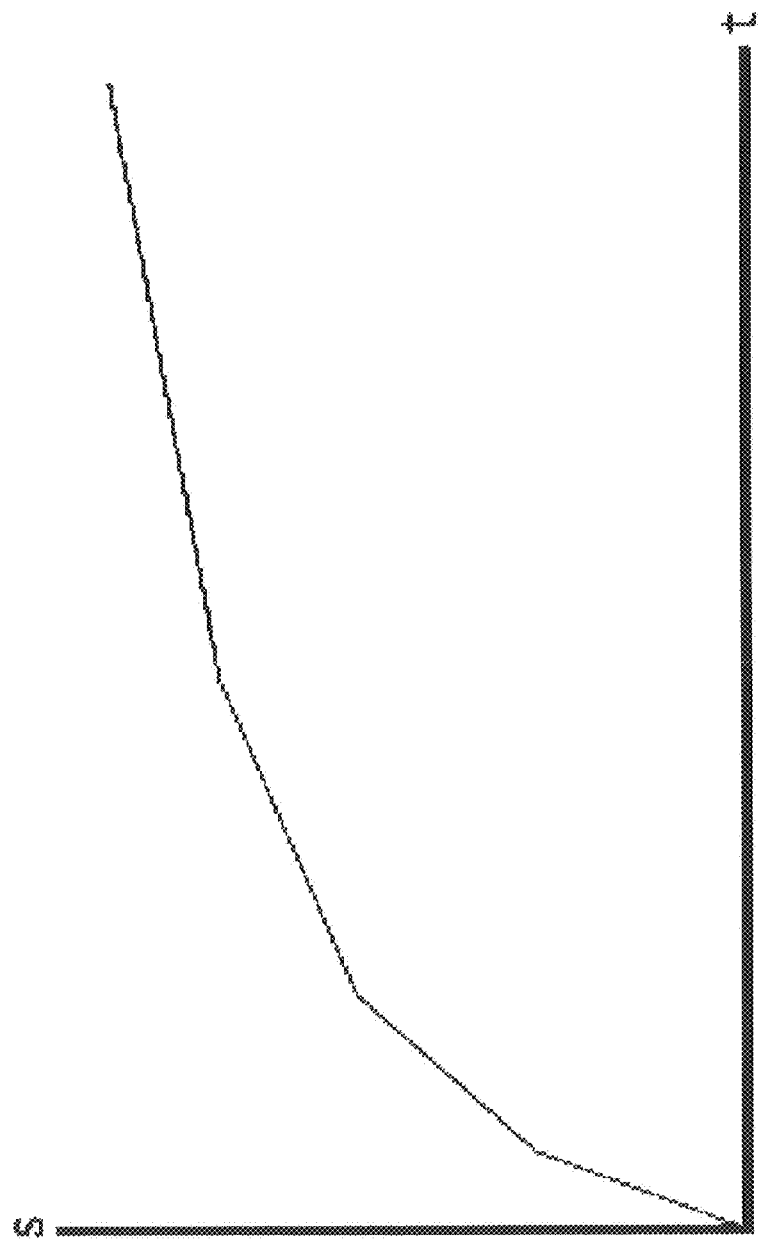
FIG. 28 shows a 4-segment piece-wise linear charging curve generated using the described hardware method.

FIG. 28 shows a 4-segment piece-wise linear charging curve generated using the described hardware method. In this example, processing units are realized in the form of neurons of a neural network.

Consider now two strongly connected neurons. The neurons may be represented as points on the charging curve depicted in FIG. 28. As time passes, the neurons' state increases, a process which may be pictured by moving the points towards the right on the charging curve. When a neuron reaches the left-hand end of the graph, it spikes and its state is reset, taking it back all the way to the right. At state value 0, neurons are said to have phase 0. Neurons spike when they reach phase $2\pi$. When a neuron spikes, all the neurons it is connected to have their state increased by a fixed amount $I_{ij}$. Depending on the current state of a receiving neuron, the increase in its state translates into a different increase in phase, as shown in FIG. 21. Let us look into the effect of two neurons interacting. Consider neurons A and B with initial phase difference $\Delta\phi \leq \pi$. When neuron A reaches the threshold, neuron B's phase is $2\pi - \Delta\phi$. The spike from neuron A increases the state of neuron B by an amount $c_1$. Since neuron B's phase is more than $\pi$, the resulting increase in its phase is large. Neuron B eventually reaches the threshold also, spiking on neuron A. At that moment, neuron A's phase is $\Delta\phi - c_1$, which is smaller than $2\pi - \Delta\phi$, the phase at which neuron B was when it received the first spike. The corresponding increase of neuron A's phase $c_2$ is thus smaller than $c_1$. After both neurons have spiked, the initial phase difference $\Delta\phi$ is reduced by an amount $c_1 - c_2$. This is due to the form of the charging curve, which translates the same connection weight $I_{ij}$ into different increases in phase. If the charging curve was a straight line, the increases in phase $c_1$ and $c_2$ would be equal and the final phase difference between the neurons would remain $\Delta\phi$ no matter what. In the example, when neuron B received the first spike, it was in the second half of the charging curve, that is, its phase was larger than $\pi$. Since both neurons are defined by the same charging curve, when neuron B reaches the threshold, neuron A inevitably lies in the first half of the charging curve. Thus, for the increases in phase to be different when the neurons receive a spike, the slope of the curve from phase 0 to $\pi$ should be different from the slope from $\pi$ to $2\pi$. In the most simple case, a concave down 2-segment piecewise linear curve would do the trick if the turning point is exactly $\pi$. If the turning point is not exactly $\pi$, there would exist some initial phase difference where the interactions between 2 neurons would not lead to their synchronization.

In hardware, a piecewise linear charging curve with equally spaced turning points is easy to implement. For example, to detect 3 equally spaced turning points, the 2 most significant bits (MSB) of the state variable may be monitored. Furthermore, it is simple in hardware to add values which are powers of 2, since they correspond to a single bit. Taking these facts into consideration, the values to add, based on the value of the state variable, may be calculated using a standard digital decoder. For instance, the 3 MSBs of the state variable are fed to the encoder which outputs a one-hot 4-bit word. This word is then shifted to the left appropriately and added to the state variable. If the word is not shifted, the state variable increases very slowly in time. Conversely, if the word is shifted by several bits, the dynamics of the state variable becomes faster. An example of a 4-segment piece-wise linear approximation using this method is given in FIG. 28.

Introduction of the Heap Queue

One configuration of the discrete aggregation engine may be efficiently implemented as an event-driven spiking neural network. In the present section, an element may be a neuron used as a processing unit. An event-driven spiking neural network predicts the moments when neurons emit spikes. These spikes represent events and are processed in the order of their occurrence. As it processes an event, the engine changes the state of the neurons involved and updates the prediction of their firing time. A sorting process may be used to keep track of the next event to happen. The process identifies a highest priority element (for example a processing unit realized as a neuron) in a set and allows the dynamic modification of the priority of any of the elements. Currently, no conventional process efficiently implements both these actions.

Several conventional software sorting processes offer a complexity in time of $O(\log(N))$, wherein $O(*)$ denotes an order of magnitude of (*), and even $O(1)$ for the insert and the delete root operations. None of them allows the efficient and intrinsic modification of an arbitrary element in the list. To support this operation, a list of pointers may be used to locate an element and then change its priority. In hardware, many conventional pipelined or parallel sorting processes offer a $O(1)$ complexity in time. Again, the location and modification of an arbitrary element in the sorted list is not supported. Furthermore, the use of an array of pointers in a parallel sorting process requires an intractable number of read and write interfaces to memory. No efficient process currently exists in hardware to sort a list and allow the dynamic modification of the priority of the sorted elements. The organized heap queue, which is a modified version of a conventional heap queue, is introduced. The organized heap queue intrinsically allows the location and modification of elements in the sorted list. In software, it may be implemented using 75% less memory overhead than the array of pointers. In hardware, there exists no other process to support the modification of an element with an O(1) complexity in time while maintaining an O(1) complexity for insertion and deletion. The organized heap queue is a more efficient solution compared to conventional methods whenever the priority of the elements to sort changes over time.

The Organized Heap Queue

Figure 29:
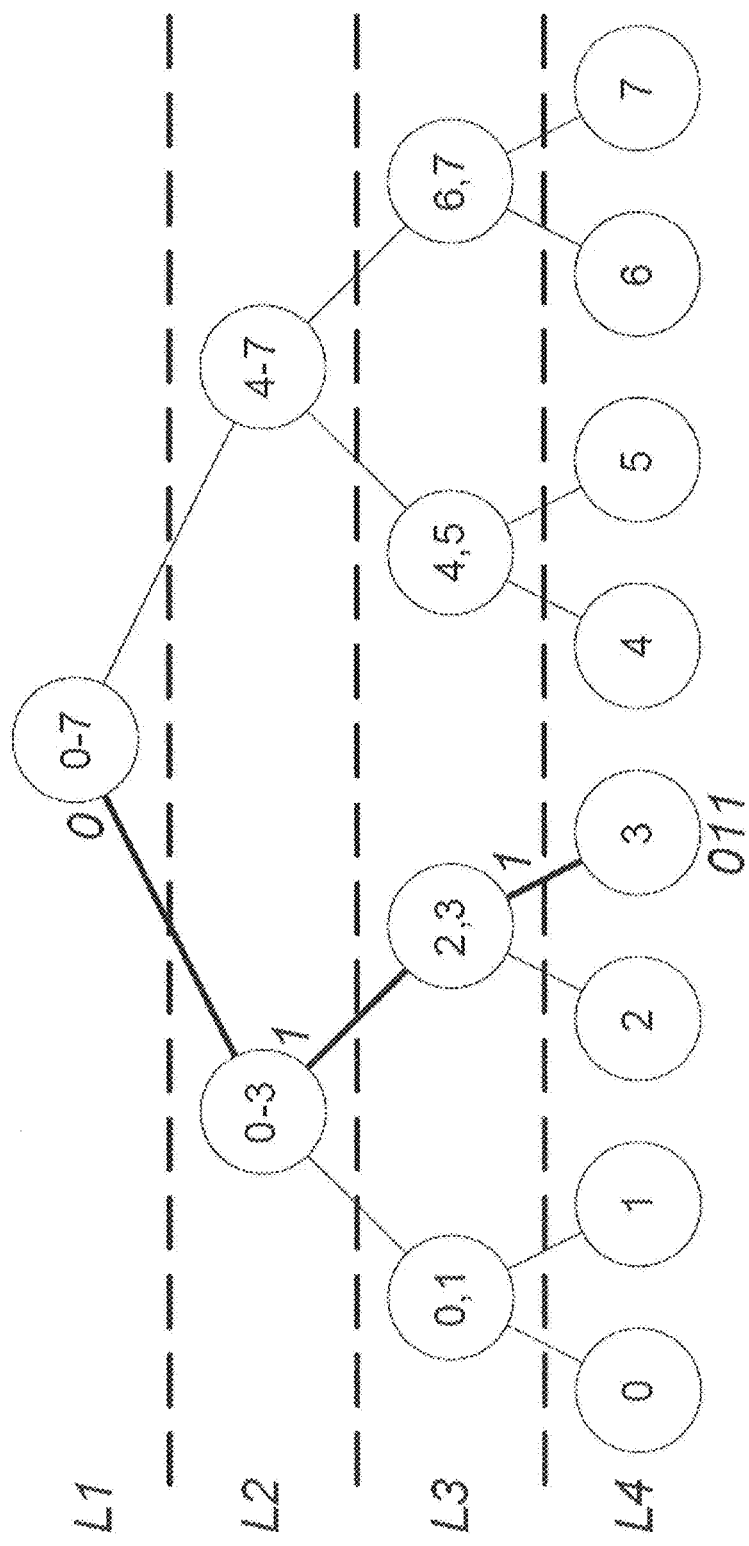
FIG. 29 is a schematic representation of a memory tree in a organized heap queue.

The organized heap queue is a sorting process derived from the heap queue. It uses a memory tree, which may be for example a binary memory tree, to store elements, which may be processing units realized in the form of neurons, and sorts them according to their priority. Elements are moved up (promoted) and down (demoted) the tree to maintain the heap property, that is, to guarantee that any node has a higher priority than its 2 children nodes. The highest priority element of the set is found in the root node at all time. Additionally, when an element is moved down the tree, it follows a specific path. FIG. 29 shows a schematic representation of a binary memory tree with the elements' path determined by their processing unit identification number (ID). The organized heap queue does not keep the binary tree balanced. Empty nodes may appear in the tree, when all of their children nodes are also empty. The organized heap queue supports the insertion of new elements and the deletion of arbitrary elements in the tree. It may also be used as a memory, as read operations are also supported.

FIG. 29 is a schematic representation of the binary memory tree in an organized heap queue. Identification numbers (ID) of each element, for example of each processing unit, are sorted in a first dimension, for example along layer L1. Each element moves down the tree following a unique path in a second dimension, from the root node to one of the leaf nodes, moving across layers L1-L4. The numbers in a node indicate which elements may possibly occupy this node. Any element may be stored in the root node, but each leaf node is specific to a single element ID. The path associated to an element is found by branching either left or right depending on the binary representation of the element's ID, starting with the MSB when branching from the root node. The path associated to the element with ID 3 is shown in bold. This 4-level queue may sort up to 8 elements.

An L-level organized heap queue may sort up to $2^{L-1}$ elements and is composed of $2^L-1$ nodes, as shown on FIG. 29. A memory-optimized version of the organized heap queue is described hereinbelow, in section "Memory-optimized organized heap queue". It may handle the same amount of elements with $1.25 \times 2^{L-1}$ nodes. In software, the complexity in time for delete, insert and read operations is O(L). In hardware, the complexity in time is O(1) for delete and insert and O(L) for the read operation. The complexity in logic is O(L). Table 1 compares the complexity of a conventional heap queue and the organized heap queue when implemented in hardware.

TABLE 1

Comparison of the hardware implementation of the standard heap queues (HQ) and the organized heap queues (OHQ), with N the number of elements to sort.

|  | HQ | OHQ |
| --- | --- | --- |
| Complexity in logic | O(log(N)) | O(log(N)) |
| Complexity in memory | O(N) | O(N) |
| Complexity in time for |  |  |
| Delete root node | O(1) | O(1) |
| Delete any node | — | O(1) |
| Insert | O(1) | O(1) |
| Read | — | O(log(N)) |
| Notes |  | Uses 25% more memory |
|  |  | May be used as a memory |

Operations in the Organized Heap Queue

All operations in an organized heap queue are issued at the root node and ripple down the tree, one level at a time.

Delete and Read Operations

The delete operation is divided into 2 phases: location and promotion. To locate an element, the nodes on its path are read, starting from the root node, until it is found. This scanning of the tree is executed one level at a time. In a delete operation, the element is removed from the tree, creating an empty node. Elements from lower levels of the tree are promoted to fill this empty node. An example of a delete operation may be seen in FIG. 30. A read operation finishes when the element is found, as its information is available right away for output.

Figure 30:
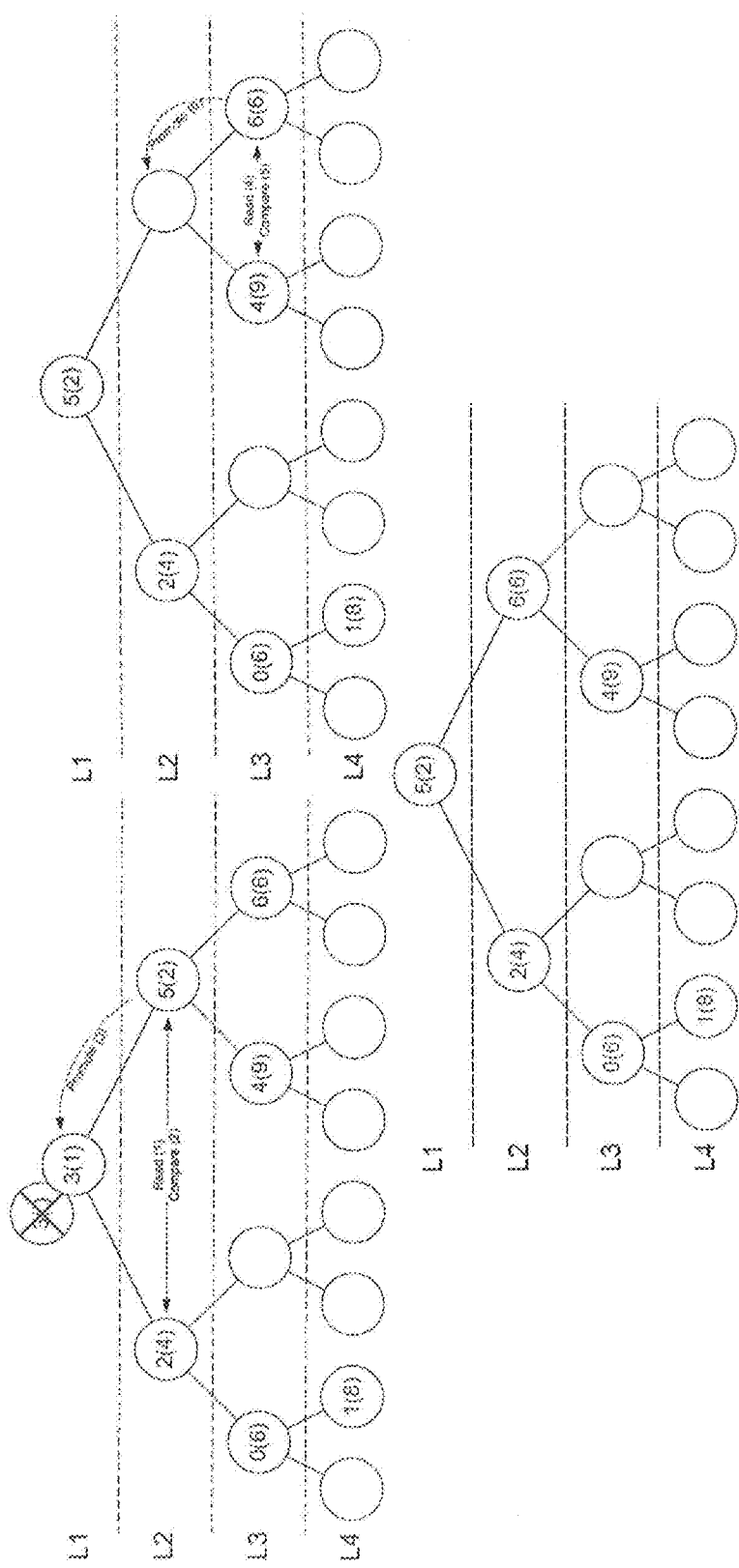
FIG. 30 shows steps of a delete operation in the organized heap queue.

FIG. 30 shows steps of a delete operation in the organized heap queue. The pair of numbers in a node indicates the identification number and, inside parentheses, the priority of the element (in this example, the lower the number inside parentheses, the higher the priority). The operation comprises the deletion of the element with identification number 3. Top left. Initial position of the queue and first steps of the delete operation. Element 3 is in the root node and thus the locate phase doesn't take place. Elements 2 and 5 are read and compared to determine that element 5 becomes promoted to replace the deleted element. Top right. Last steps of the delete operation. Elements 4 and 6 are read and compared and the latter is promoted. Bottom Final position of the queue after the delete operation.

Insert Operation

When an element is inserted, it is compared with the elements located on its path. The inserted element is pushed down the tree as long as it encounters elements with a higher priority than its own. When it finds a node with a lower priority element, it takes its place and pushes this element down the tree. An example of an insert operation is shown in FIG. 31.

Figure 31:
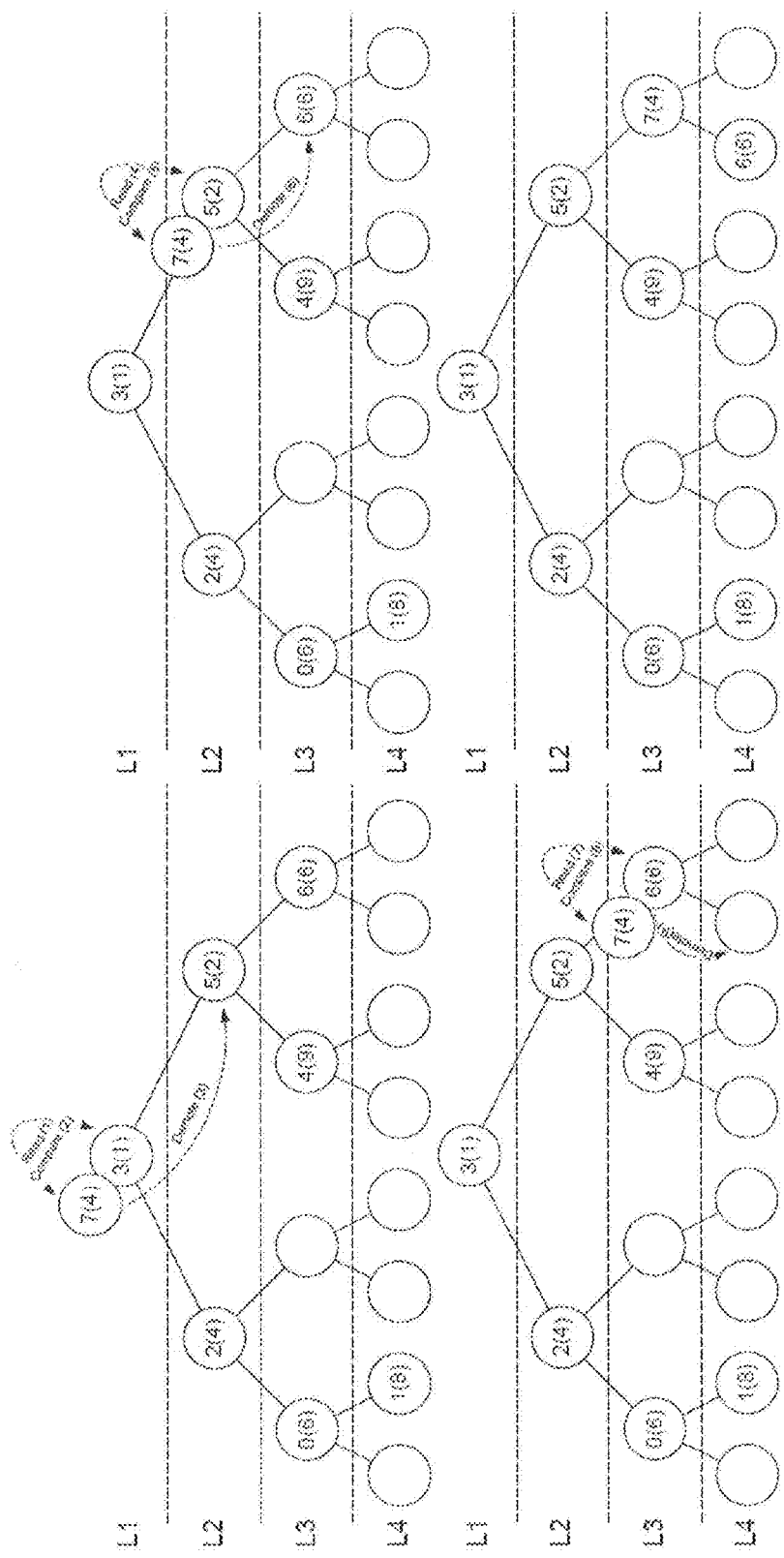
FIG. 31 shows steps of an insert operation in the organized heap queue.

FIG. 31 shows steps of an insert operation in the organized heap queue. The pair of numbers in a node indicates the identification number and, inside parentheses, the priority of the element (in this example, the lower the number inside parentheses, the higher the priority). The operation comprises the insertion of the element 7 with priority 4. Top left. Initial position of the queue and first steps of the insert operation. Elements 7 and 3 are read and compared to determine that the former is to be demoted Top right. Intermediate steps of the insert operation. Elements 7 and 5 are read and compared and the former is demoted. Bottom left. Last steps of the delete-insert operation. Elements 7 and 6 are read and compared and element 6 is demoted. Bottom right. Final position of the queue after the insert operation.

Pipelining the Operations

Figure 32:
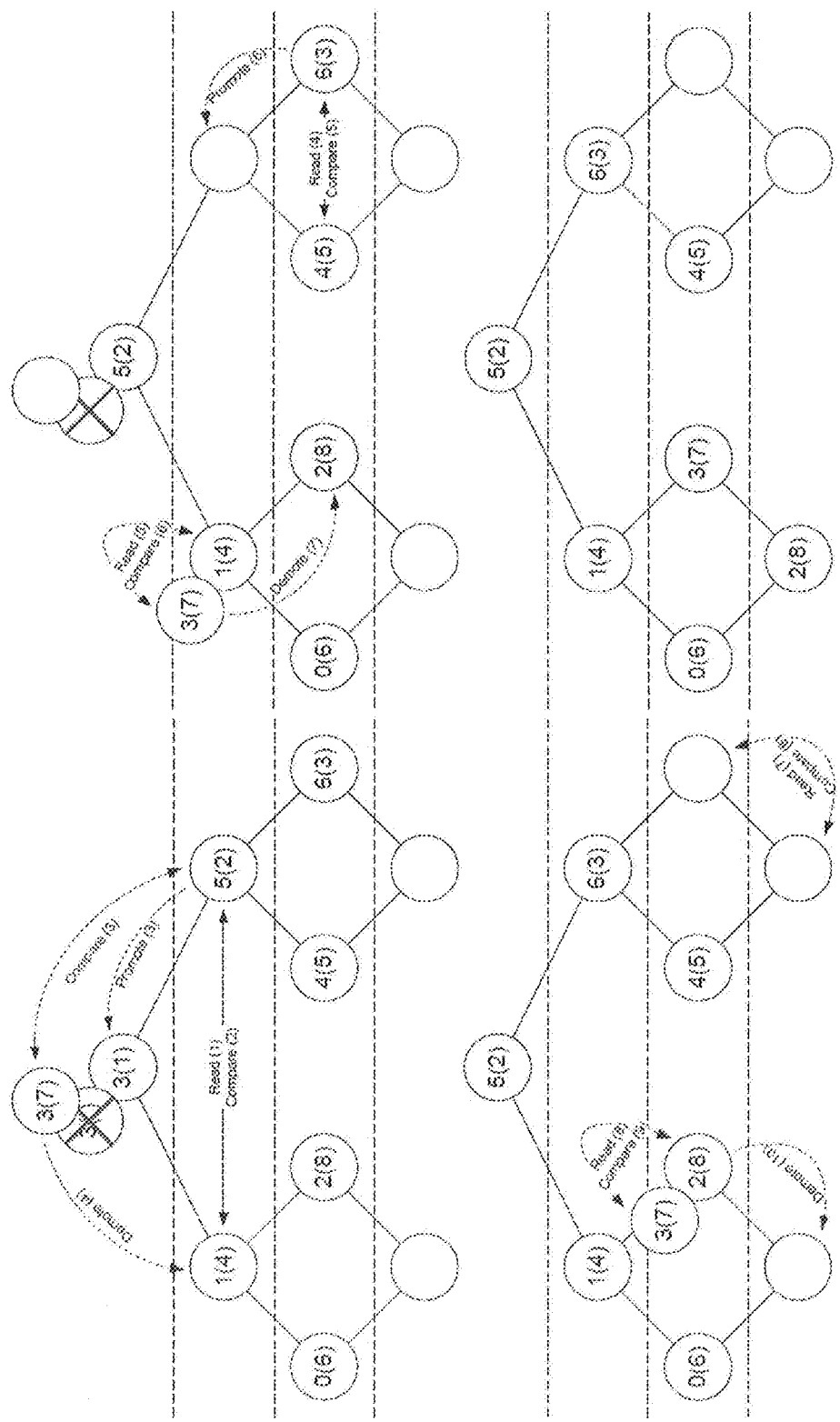
FIG. 32 shows steps of a delete-insert operation in a memory-optimized organized heap queue.

The operations in the organized heap queue may be pipelined. As soon as an operation is passed to a lower level of the tree, another one may be serviced at the current level. The heap property is thus satisfied and the highest priority element occupies the root node at all time, even if operations are still going on in lower levels of the tree. Delete operations, since they deal with data on 2 levels of the tree, 1 node and its 2 children nodes, take longer to execute than insert operations. Table 2 shows how delete and insert operations may be pipelined if reads, comparisons and write-backs each take one clock cycle to execute. Delete and insert operations may also be interleaved, for example to change the priority of an element. If the comparison in the insert operation is allowed to use the result of the comparison of the delete operation, delete-insert operations uses a single extra clock cycle over a delete operation. FIG. 32 shows an example of a delete-insert operation in a 4-level memory-optimized organized heap queue introduced in the next section.

TABLE 2

Pipelining delete and insert operations in the organized heap queue

| Operations | Clock cycle | | | | | | | |
|---|---|---|---|---|---|---|---|---|
| | 1 | 2 | 3 | 4 | 5 | 6 | 7 | 8 |
| Delete | r(L2) × 2 | c(L1) | w(L1) | r(L3) × 2 | c(L2) | w(L2) | r(L4) × 2 | c(L3) |
| Delete | — | — | — | — | — | — | r(L2) × 2 | c(L1) |
| Insert | r(L1) | c(L1) | w(L1) | r(L2) | c(L2) | w(L2) | r(L3) | c(L3) |
| Insert | — | — | — | r(L1) | c(L1) | w(L1) | r(L2) | c(L2) |
| Delete | r(L2) × 2 | c(L1) | w(L1) | r(L3) × 2 | c(L2) | w(L2) | r(L4) × 2 | c(L3) |
| Insert | — | r(L1) | c(L1) | w(L1) | r(L2) | c(L2) | w(L2) | r(L3) |
| Delete | — | — | — | — | — | — | — | r(L2) × 2 |

Table 2 shows how to pipeline several operations in the organized heap queue. Each operation involves reading one or two elements on a given level of the tree, then comparing them together or with an inserted element, writing back one of the elements on the current level and finally passing the operation to the next level down the tree. In Table 2, r( ) stands for a read, c( ) is a comparison and w( ) is a write. The "Lx" inside parentheses indicates the level of the tree where an operation takes place. A "-" sign means that the operation has not started yet.

FIG. 32 shows steps of a delete-insert operation in a memory-optimized organized heap queue. The pair of numbers in a node indicates the identification number and, inside parentheses, the priority of the element (in this case, the lower the number inside parentheses, the higher the priority). The operation comprises the deletion of the element with identification number 3 directly followed with the insertion of the same element, changing its priority Top left. Initial position of the organized heap queue and first steps of the delete-insert operation. Elements 1 and 5 are read and compared to determine which one becomes promoted to replace the deleted element. If the promoted element has a higher priority than the element inserted in the delete-insert operation, the latter is demoted. Otherwise, the inserted element would end up at the root node and the promoted element be returned to its former position. Top right. Intermediate steps of the delete-insert operation. Elements 4 and 6 are read and compared and the latter is promoted. Elements 3 and 1 are read and compared and the former is demoted. A new delete-insert operation may be issued during the $7^{th}$ clock cycle. Bottom left. Last steps of the delete-insert operation. If there were elements left in the path of the promoted element, they would be compared and moved appropriately. Elements 3 and 2 are read and compared and the latter is demoted. Bottom right. Final position of the organized heap queue after the delete-insert operation.

Memory-Optimized Organized Heap Queue

An L-level organized heap queue as it was presented in the previous sections comprises $2^L-1$ nodes and may sort up to $2^{L-1}$ elements. The queue uses $2^{L-1}-1$ more memory locations than the number of elements it may actually handle. Actually, the last level of the tree alone provides enough memory to store the entire set of elements to sort. However, empty nodes are not allowed to form in the middle of the tree and the last layer may not be full, since this would imply that the rest of the tree be empty. The size of the last level of the tree may thus be reduced. A 3-level queue may handle 4 elements and comprises 7 nodes. For an element to be allowed to occupy a node on the last level, all the other elements are located in the other upper levels of the tree. Thus, in a 3-level queue, 1 of the 4 nodes of the last level may be occupied. Increasing the size of the queue to 4 levels comprises adding another 3-level queue next to the first one plus a new root node on top of them. The queue may now sort up to 8 elements. Still, a single element may go all the way down each of the 3-level queues. This reasoning holds true whatever the size of the queue. The memory-optimized organized heap queue reduces the size of the last level of the memory tree by 75%. An example of a 4-level memory-optimized organized heap queue is shown on FIG. 33. The last level of a memory-optimized organized heap queue is handled differently than the other ones, since each of its nodes has 2 parent nodes. Also, each path down the tree is now shared by 2 elements.

Figure 33:
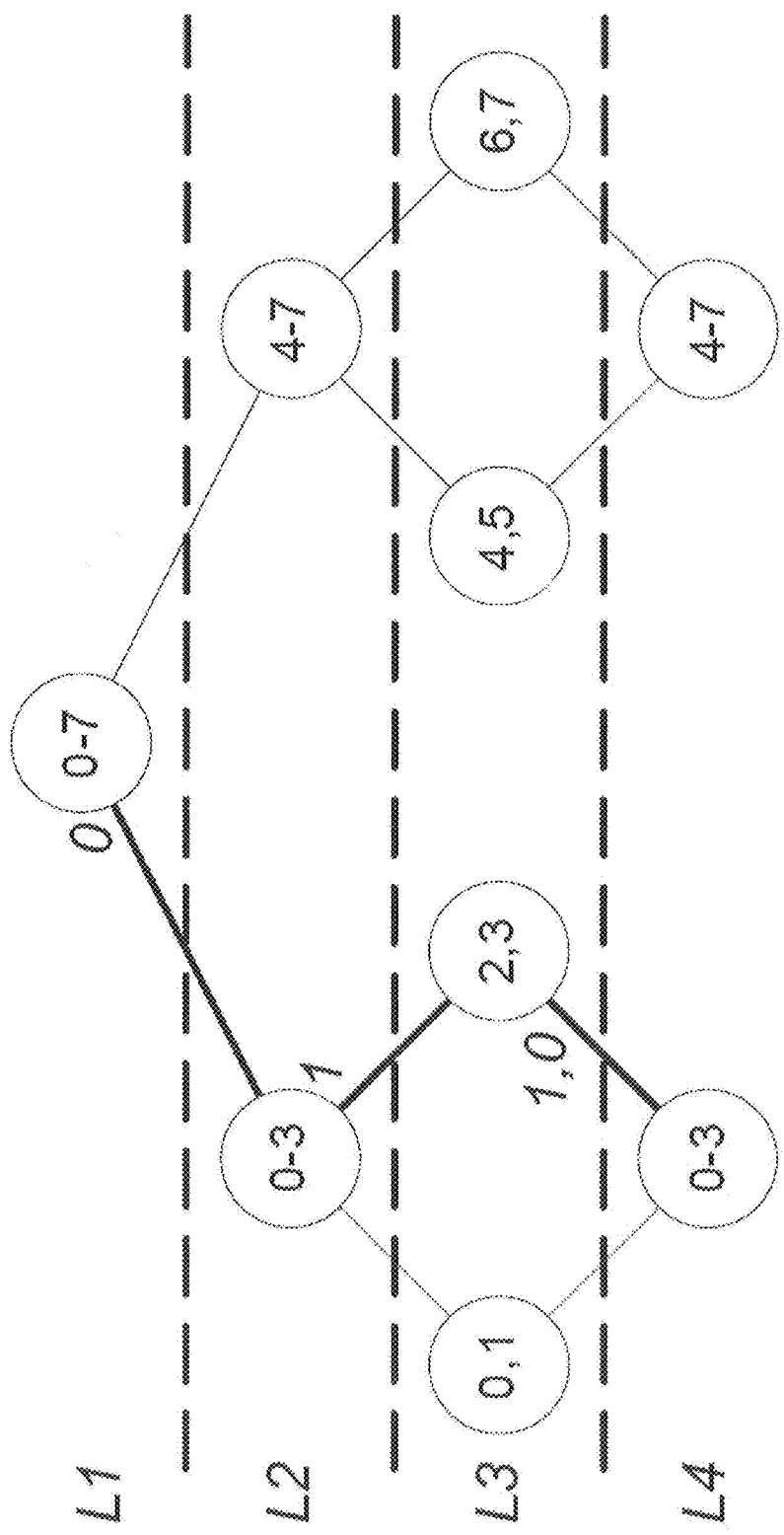
FIG. 33 shows a memory-optimized organized heap queue.

FIG. 33 shows a memory-optimized organized heap queue. The numbers in a node indicate which elements may possibly occupy this node. The path associated to an element is found by branching either left or right depending on the binary representation of the element's identification number. In this version, the paths are shared by pairs of 2 elements. In FIG. 33, the path shown in bold is shared by elements 2 and 3. Elements share paths, but they still may be distinguished by reading their information in the nodes. The last level of the tree uses 75% less memory than in the naive version.

Resizing the Queue

The path of the elements to sort may be calculated in different ways. One way is to use the binary representation of the elements, MSB first, as shown in FIG. 29. Another way is to use the LSB first. It is interesting to see the effect of this change on the behavior of the queue. In the first case, for an L-level queue, if the elements are inserted in the order of their identification number, they will pile up on the left-hand side of the tree and gradually fill the right-hand side as the numbers increase. When using the LSB first, the elements will evenly fill the upper levels of the tree, moving down to lower levels as the IDs increase. This even distribution of the elements is useful if the number of elements to sort is unknown before the time of execution. Since the tree fills up evenly, subsequent levels of the tree may be added on the fly, when the number of elements to sort exceeds the capacity of the queue. This property of the LSB first organized heap queue is of particular interest for software implementations, where memory may be added on the fly, as it is needed.

Setup in a Spiking Neural Network

Figure 34:
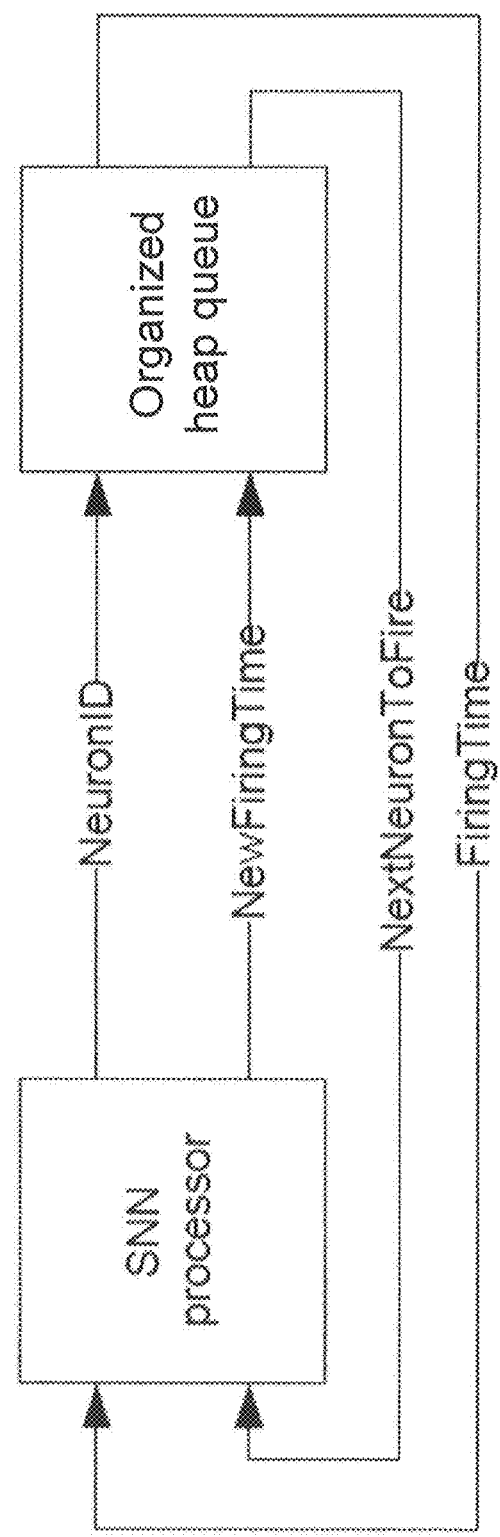
FIG. 34 is an illustration of a basic setup to use the organized heap queue in a network of spiking neurons.

In an event-driven implementation of spiking neural networks, the queue is directly coupled with the processing module, as shown in FIG. 34.

FIG. 34 is an illustration of a basic setup to use the organized heap queue in a network of spiking neurons (SNN). The SNN processor reads the top element of the queue, which is the label (ID) and firing time, or priority, of the next neuron in the network to emit a spike. The SNN processor determines which neurons are affected by the spike and computes their new firing time. The SNN processor sends the ID and the new firing time of all the affected neurons to the queue. The organized heap queue executes a delete-insert operation to remove the old firing time of the neuron from the queue and replace it with the new one. Once the last delete-insert operation is executed, the SNN processor may again get the next neuron to fire by reading the top element of the queue.

CONCLUSION

Those of ordinary skill in the art will realize that the description of the system, aggregation engine and method for providing structural representations of physical entities are illustrative only and are not intended to be in any way limiting. Other embodiments will readily suggest themselves to such persons with ordinary skill in the art having the benefit of the present disclosure. Furthermore, the disclosed system, processing unit and method may be customized to offer valuable solutions to existing needs and problems of graphically representing various types of physical entities.

In the interest of clarity, not all of the routine features of the implementations of the system, aggregation engine and method are shown and described. It will, of course, be appreciated that in the development of any such actual implementation of the system, aggregation engine and method for providing structural representations of physical entities, numerous implementation-specific decisions may need to be made in order to achieve the developer's specific goals, such as compliance with application-, system-, network- and business-related constraints, and that these specific goals will vary from one implementation to another and from one developer to another. Moreover, it will be appreciated that a development effort might be complex and time-consuming, but would nevertheless be a routine undertaking of engineering for those of ordinary skill in the field of intelligent systems having the benefit of the present disclosure.

In accordance with the present disclosure, the components, process steps, and/or data structures described herein may be implemented using various types of operating systems, computing platforms, network devices, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used. Where a method comprising a series of process steps is implemented by a computer or a machine and those process steps may be stored as a series of instructions readable by the machine, they may be stored on a tangible medium.

Systems and modules described herein may comprise software, firmware, hardware, or any combination(s) of software, firmware, or hardware suitable for the purposes described herein. Software and other modules may reside on servers, workstations, personal computers, computerized tablets, personal digital assistants (PDA), and other devices suitable for the purposes described herein. Software and other modules may be accessible via local memory, via a network, via a browser or other application or via other means suitable for the purposes described herein. Data structures described herein may comprise computer files, variables, programming arrays, programming structures, or any electronic information storage schemes or methods, or any combinations thereof, suitable for the purposes described herein.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A method for providing a structural representation of a physical entity, comprising:

updating, through at least one iteration of an aggregation engine, a state and a label of a first processing unit based on a state and on a label of a second processing unit and based on a link defined between the first processing unit and the second processing unit;

forming a graphical representation of the physical entity based on the link and on the labels of the first and second processing units; and outputting the graphical representation;

wherein a state of a given processing unit reflects a level of influence the given processing unit on other processing units and wherein a label of the given processing unit is an internal representation of a given element of the physical entity;

wherein updating the state and the label of the first processing unit is further based on the state and the label of the first processing unit before the at least one iteration; and wherein a strength of the link between the first and second processing units is set according to a relationship of respective elements of the physical entity.

2. The method of claim 1, wherein updating through a plurality of iterations the states and the labels of the first and second processing units provides an aggregation of the first and second processing units if their labels have similar values.

3. The method of claim 1, comprising:

using a multi-level pooling layer to extract strongest features of the physical entity; and modulating the strength of the link between the first and second processing units using the strongest features.

4. The method of claim 1, comprising:

forming a hierarchy of elements of the physical entity, wherein elements defining prominent features of the physical entity acquire a high level in the hierarchy; and modulating the strength of the link based on a level in the hierarchy of elements corresponding to the first and second processing units.

5. The method of claim 1, comprising:

associating a first set of processing units to elements of a first structure of the physical entity to form a graphical representation of a reference pattern;

associating a second set of processing units to elements of a second structure of the physical entity;

identifying in the second structure a pattern similar to the reference pattern; and reducing link strengths between processing units of the second set;

whereby higher link strengths between processing units of the first set and processing units of the second set trigger an aggregation of the first and second structures.

6. The method of claim 5, wherein identifying in the second structure a pattern similar to the reference pattern comprises:

calculating scores based on link strengths between processing units corresponding to features of the first structure and processing units corresponding to features of the second structure; and selecting anchor points between the first and second structures based on highest calculated scores.

7. The method of claim 1, comprising updating the state and the label of the first processing unit based on states and on labels of all other processing units having links with the first processing unit.

8. The method of claim 1, comprising updating the state and the label of the first processing unit based on states and on labels of an elected set of processing units.

9. The method of claim 1, wherein:

updating the state and the label of the first processing unit comprises setting the label of the first processing unit to a value of the label of the second processing unit if:

the state of the second processing unit has reached a threshold, and a sum of the state of the first processing unit and of the strength of the link between the first and second processing unit reaches the threshold.

10. The method of claim 9, comprising resetting the state of the second processing unit following the setting of the label of the first processing unit to the value of the label of the second processing unit.

11. The method of claim 1, comprising:

a) identifying a significant feature of the physical entity;
b) associating the significant feature to a first sub-graph;
c) distributing a label associated with the significant feature between a plurality of processing units;
d) repeating steps a, b and c for a number N of significant features of the physical entity;
e) connecting N resulting sub-graphs to reveal common sub-graph structures; and
f) generating a score to characterize a degree of matching between the sub-graphs.

12. The method of claim 11, wherein:

step a) is performed using continuous processing units;
step c) is performed using discrete processing units;
label distribution includes clustering of states and labels of processing units associated with a given significant feature; and
step e is performed by the aggregation engine.

13. A system for providing a structural representation of a physical entity, comprising:

a first processing unit having a label representing an element of a physical entity, the first processing unit further having a state and a link element for setting up at least one link towards a second processing unit;

an aggregation engine for updating, through at least one iteration, the state and the label of the first processing unit based on a state and on a label of the second processing unit, and on the at least one link; and an output for providing a graphical representation of the physical entity based on the at least one link and on the labels of the first and second processing units;

wherein each of the processing units comprise a processor coupled to a memory, the memory being configured to store a value of a label and a value of a state for the processing unit and to store a value of a link between the processing unit and another processing unit;

wherein a state of a given processing unit reflects a level of influence the given processing unit on other processing units and wherein a label of the given processing unit is an internal representation of a given element of the physical entity;

wherein updating the state and the label of the first processing unit is further based on the state and the label of the first processing unit before the at least one iteration; and wherein a strength of the at least one link between the first and second processing units is set according to a relationship of respective elements of the physical entity.

14. The system of claim 13, comprising an initialization module for assigning initial values to the labels and to the states of the first and second processing unit before a first iteration by the aggregation engine.

15. The system of claim 13, comprising a mapping module for assigning an initial strength value to the at least one link before a first iteration by the aggregation engine and for updating the strength value of the at least one link after an iteration of the aggregation engine.

16. The system of claim 13, wherein, in one iteration, the state of the first processing unit is set based on the state of the first processing unit in a previous iteration, on the state of the second processing unit, on the strength of the at least one link, and on features of the first and second processing units.

17. The device of claim 16, wherein the first processing unit is capable of generating an event for propagating its label to the second processing unit.

18. The system of claim 13, comprising a sorting module for determining, based on the labels or on the states, an upcoming iteration when at least one of the first or second processing unit is expected to be updated.

19. The system of claim 18, wherein the sorting module comprises a memory tree for sorting expected updating iterations and processing unit identification numbers.

20. The system of claim 19, wherein the expected updating iterations are sorted in one dimension of the memory tree and the processing unit identification numbers are sorted in another dimension of the memory tree.

21. The system of claim 13, wherein the physical entity comprises an element selected from the group consisting of an image, a video sequence, a sound sequence, a music sequence, and a network.

22. The system of claim 13, wherein first and second processing units are neurons of a neural network.

23. An aggregation engine for providing a structural representation of a physical entity, comprising:

an interface for communicating with processing units;

a memory configured to store values of labels and values of states for a plurality of processing units, and to store values of links between the processing units;

a processor coupled to the memory, the processor being configured to update, through at least one iteration, a state and a label of a first processing unit based on a state and on a label of a second processing unit, and on a link defined between the first processing unit and the second processing unit; and a graphical unit for forming a graphical representation of the physical entity based on the link and on the labels of the first and second processing units and a graphical interface for outputting the graphical representation;

wherein a state of a given processing unit reflects a level of influence the given processing unit on other processing units and wherein a label of the given processing unit is an internal representation of a given element of the physical entity;

wherein updating the state and the label of the first processing unit is further based on the state and the label of the first processing unit before the at least one iteration; and wherein a strength of the link between the first and second processing units is set according to a relationship of respective elements of the physical entity.

24. The aggregation engine of claim 23, wherein the processor is configured to update the states of a plurality of processing units in parallel.

25. The aggregation engine of claim 23, wherein the processor is configured to propagate a label of a dominant processing unit to connected processing units.

26. The aggregation engine of claim 23, comprising a sorting module for sorting the states of the physical entities according to state priorities.

27. The aggregation engine of claim 26, wherein the sorting module comprises a memory tree.

* * * * *